US009997968B2

(12) United States Patent
Kitada

(10) Patent No.: US 9,997,968 B2
(45) Date of Patent: Jun. 12, 2018

(54) FIXING RESIN COMPOSITION, ROTOR, AUTOMOBILE, AND METHOD OF MANUFACTURING ROTOR

(71) Applicant: SUMITOMO BAKELITE CO., LTD., Tokyo (JP)

(72) Inventor: Tetsuya Kitada, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 597 days.

(21) Appl. No.: 14/361,193

(22) PCT Filed: Oct. 2, 2012

(86) PCT No.: PCT/JP2012/075560
§ 371 (c)(1),
(2) Date: May 28, 2014

(87) PCT Pub. No.: WO2013/080654
PCT Pub. Date: Jun. 6, 2013

(65) Prior Publication Data
US 2014/0327329 A1    Nov. 6, 2014

(30) Foreign Application Priority Data
Nov. 29, 2011 (JP) ................... 2011-260440

(51) Int. Cl.
*H02K 1/27* (2006.01)
*H02K 15/03* (2006.01)
(Continued)

(52) U.S. Cl.
CPC .......... *H02K 1/276* (2013.01); *C08G 59/621* (2013.01); *C08G 59/688* (2013.01); *C08L 63/00* (2013.01);
(Continued)

(58) Field of Classification Search
None
See application file for complete search history.

(56) References Cited

U.S. PATENT DOCUMENTS 5,747,565 A * 5/1998 Ono ................ C08G 59/226
523/413
7,723,444 B2   5/2010 Akiyama et al.
(Continued)

FOREIGN PATENT DOCUMENTS

CN   101107285 A   1/2008
CN   101300728 A   11/2008
(Continued)

OTHER PUBLICATIONS

Machine translation of JP 2001-102498 A (no date).*
(Continued)

*Primary Examiner* — Michael J Feely
(74) *Attorney, Agent, or Firm* — Birch, Stewart, Kolasch & Birch, LLP

(57) ABSTRACT

A solid fixing resin composition, which has excellent filling properties, and a rotor using the same are provided. The fixing resin composition is used to form a fixing member constituting a rotor which includes a rotor core (110) which has a laminate formed by lamination of a plurality of plate members, is fixed and installed on a rotating shaft, and has a plurality of hole portions (150) arranged along the peripheral portion of the rotating shaft, provided in the laminate; a magnet (120) inserted in the hole portion (150); and a fixing member (130) formed by curing a fixing resin composition, filled in the separation portion between the hole portion (150) and the magnet (120), the resin composition including a thermosetting resin (A) containing an epoxy
(Continued)

resin; a curing agent (B); and an inorganic filler (C), in which the ICI viscosity at 150° C. of the epoxy resin is equal to or less than 3 poises.

19 Claims, 8 Drawing Sheets

(51) Int. Cl.
*C08L 63/00* (2006.01)
*C08L 63/04* (2006.01)
*C08G 59/62* (2006.01)
*C08G 59/68* (2006.01)
*H02K 5/02* (2006.01)

(52) U.S. Cl.
CPC ............ *C08L 63/04* (2013.01); *H02K 1/2766* (2013.01); *H02K 5/02* (2013.01); *H02K 15/03* (2013.01); *H02K 2201/09* (2013.01); *Y10T 29/49012* (2015.01)

(56) References Cited

U.S. PATENT DOCUMENTS

| | | | |
|---|---|---|---|
| 7,854,056 B2 | 12/2010 | Watanabe et al. | |
| 8,020,280 B2 | 9/2011 | Fukumaru et al. | |
| 8,502,399 B2 | 8/2013 | Wada | |
| 2006/0189721 A1 | 8/2006 | Akiyama et al. | |
| 2007/0179259 A1* | 8/2007 | Osada | C08G 59/38 525/524 |
| 2007/0213477 A1* | 9/2007 | Ukawa | C08G 59/245 525/523 |
| 2009/0026867 A1* | 1/2009 | Haruno | H02K 1/2766 310/156.21 |
| 2009/0174273 A1 | 7/2009 | Watanabe et al. | |
| 2011/0000079 A1 | 1/2011 | Fukumaru et al. | |
| 2012/0080809 A1 | 4/2012 | Wada | |
| 2012/0139378 A1 | 6/2012 | Endo | |
| 2013/0009327 A1 | 1/2013 | Tanaka | |
| 2013/0162063 A1 | 6/2013 | Sasajima | |

FOREIGN PATENT DOCUMENTS

| | | | | |
|---|---|---|---|---|
| CN | 101379682 A | 3/2009 | | |
| JP | 11-98735 A | 4/1999 | | |
| JP | 2000-109649 A | 4/2000 | | |
| JP | 2000-316243 A | 11/2000 | | |
| JP | 2001-102498 A | * 4/2001 | ............ H01L 23/29 |
| JP | 2002-359942 A | 12/2002 | | |
| JP | 2003-199303 A | 7/2003 | | |
| JP | 2005-304247 A | 10/2005 | | |
| JP | 2005-314562 A | 11/2005 | | |
| JP | 2007-161832 A | 6/2007 | | |
| JP | 2007-236020 A | 9/2007 | | |
| JP | 2009-13213 A | 1/2009 | | |
| WO | WO 2007/026900 A1 | 3/2007 | | |
| WO | WO 2010/150487 A1 | 12/2010 | | |
| WO | WO 2011/077513 A1 | 6/2011 | | |
| WO | WO 2011/114687 A1 | 9/2011 | | |
| WO | WO 2012/029278 A1 | 3/2012 | | |

OTHER PUBLICATIONS

Office Action and Search Report issued in the corresponding Chinese Patent Application No. 201280058193.5 dated Jan. 4, 2016.
PCT/ISA/201—International Search Report dated Dec. 11, 2012, issued in PCT/JP2012/075560.

* cited by examiner

FIXING RESIN COMPOSITION, ROTOR, AUTOMOBILE, AND METHOD OF MANUFACTURING ROTOR

TECHNICAL FIELD

The present invention relates to a fixing resin composition used in a rotor, a rotor, an automobile, and a method of manufacturing a rotor.

Priority is claimed on Japanese Patent Application No. 2011-260440 filed on Nov. 29, 2011, the amount of which is incorporated herein by reference.

BACKGROUND ART

Recently, in the technical field of rotors, technology, in which a permanent magnet is inserted into a hole portion provided in a rotor core and a liquid resin is filled between the hole portion and the permanent magnet to fix the permanent magnet to the rotor core, has been used. In this technical field, a urethane resin, an epoxy resin, and the like are usually employed as the liquid resin. Such technology is described in, for example, PTL 1.

Furthermore, in PTL 2, an epoxy resin used to encapsulate a motor, and a molded article formed by curing the same are described. It is described that working environment properties, productivity, heat resistance, heat conductivity, solvent resistance, high humidity water resistance, and a low linear expansion coefficient are obtained in the molded article. For this reason, it is thought that the molded article described in PTL 2 is used as a housing of a motor.

Moreover, the rotor described in PTL 3 has a structure where a second hole portion communicating with a first hole portion and positioning along the rotation direction of the rotor is formed on the side of the first hole portion accommodating a permanent magnet. By filling a resin or disposing a spring in the second hole portion, stress that the permanent magnet receives from the side wall of the first hole portion in the rotation direction of the rotor is reduced, which is described as being capable of preventing cracking of the permanent magnet.

Incidentally, as a technique used to fill a liquid resin between the hole portion and the magnet of the rotor core, there exist two techniques, a first-in technique and a coating technique. The first-in technique includes the following steps. First, a liquid resin is filled into a hole portion of a rotor core by a dispenser. Thereafter, a magnet is inserted in the hole portions filled with the liquid resin. The first-in technique is described in PTLs 4 and 5. On the other hand, the coating technique includes the following steps. First, the magnet is coated with the liquid resin with a brush. Then the magnet coated with the liquid resin is inserted in the hole portions of the rotor core. The coating technique is described in PTL 6.

[PTL 1] Japanese Unexamined Patent Application, First Publication No. 2007-236020

[PTL 2] Japanese Unexamined Patent Application, First Publication No. 2009-13213

[PTL 3] Japanese Unexamined Patent Application, First Publication No. 2002-359942

[PTL 4] Japanese Unexamined Patent Application, First Publication No. 2005-304247

[PTL 5] Japanese Unexamined Patent Application, First Publication No. H11-98735

[PTL 6] Japanese Unexamined Patent Application, First Publication No. 2003-199303

SUMMARY OF INVENTION

It is difficult to apply the above-described technology used to fill a liquid resin to an injecting method of injecting a resin into a gap between a hole portion of a rotor core and a magnet inserted in advance to the hole portion.

Further, the epoxy resin described in PTL 2 is intended to cover the entire motor. Therefore, it is difficult to use the resin described in PTL 2 in order to fix the permanent magnet.

Therefore, the present inventors have conducted studies and as a result, they have found that it is possible to fill a resin into a gap between a hole portion of a rotor core and a magnet inserted in advance into the hole portion by employing insert molding.

However, in the case where the gap between the hole portion and the magnet of the rotor core is narrow, there is a risk that a molten resin may not be filled in the gap. Accordingly, the present inventors believe that there is still room for improvement of the melt viscosity of a solid resin in order to enhance its gap filling properties.

According to the present invention, a fixing resin composition, used to form a fixing member constituting a rotor which includes a rotor core which has a laminate formed by lamination of a plurality of plate members and is fixed and installed on a rotating shaft, wherein a plurality of hole portions arranged along the peripheral portion of the rotating shaft are provided on the laminate; a magnet inserted in the hole portions; and a fixing member formed by curing the fixing resin composition filled in a separation portion between the hole portion and the magnet, the fixing resin composition including a thermosetting resin (A) containing an epoxy resin, a curing agent (B), and an inorganic filler (C), in which the ICI viscosity at 150° C. of the epoxy resin is equal to or less than 3 poises, is provided.

According to the present invention, a solid fixing resin composition, having excellent filling properties, and a rotor using the same are provided.

BRIEF DESCRIPTION OF DRAWINGS

The above-described objects and other objects, features, and advantages become more apparent with reference to suitable embodiments as described later and the accompanying drawings below.

DESCRIPTION OF EMBODIMENTS

Figure 1:
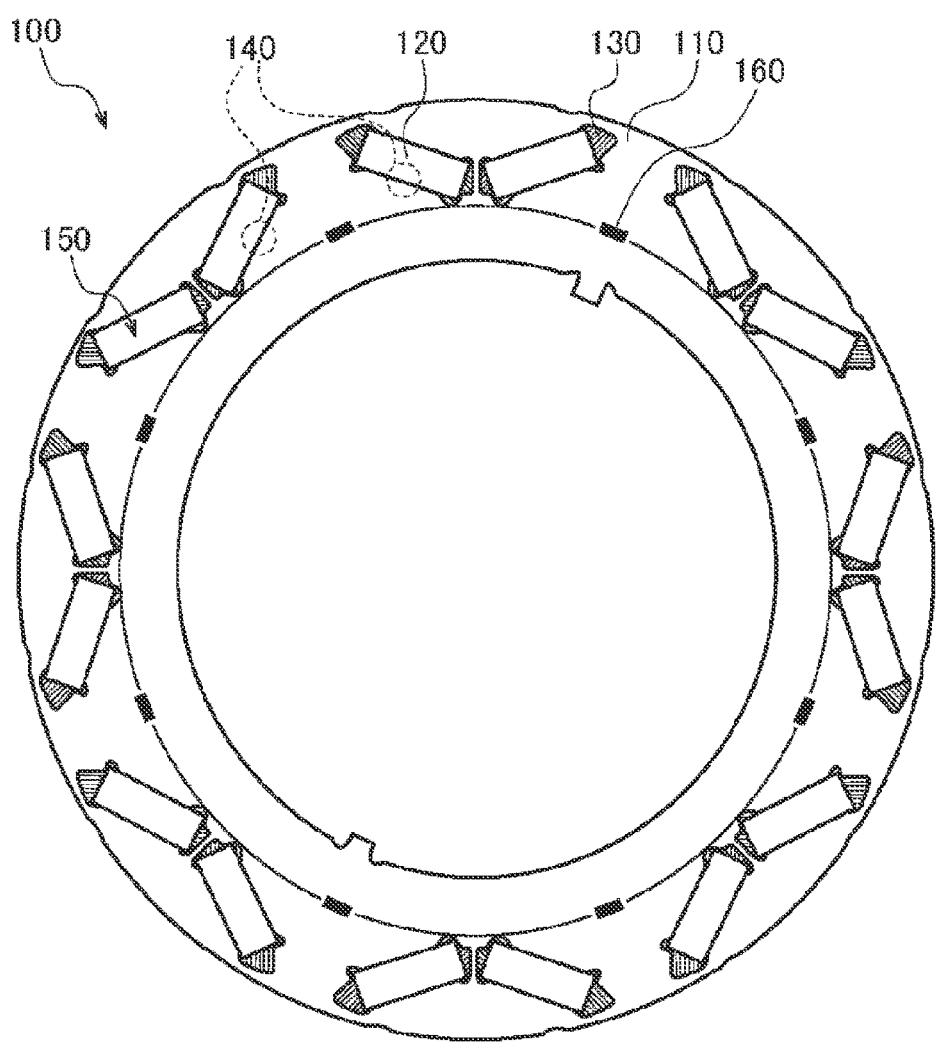
FIG. 1 is a top view schematically showing a rotor according to an embodiment of the present invention.

Hereinafter, the embodiments of the present invention will be described with reference to the drawings. Incidentally, in all the drawings, the same reference numerals are attached to the same components and an explanation thereof will not be repeated as appropriate.

Figure 3:
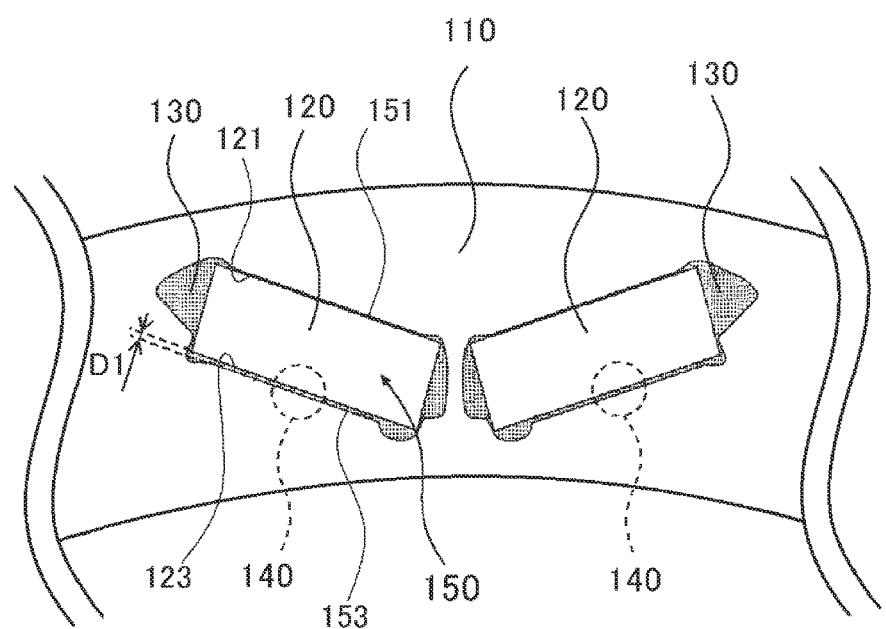
FIG. 3 is an enlarged view schematically showing a part of a rotor according to an embodiment of the present invention.
Figure 4:
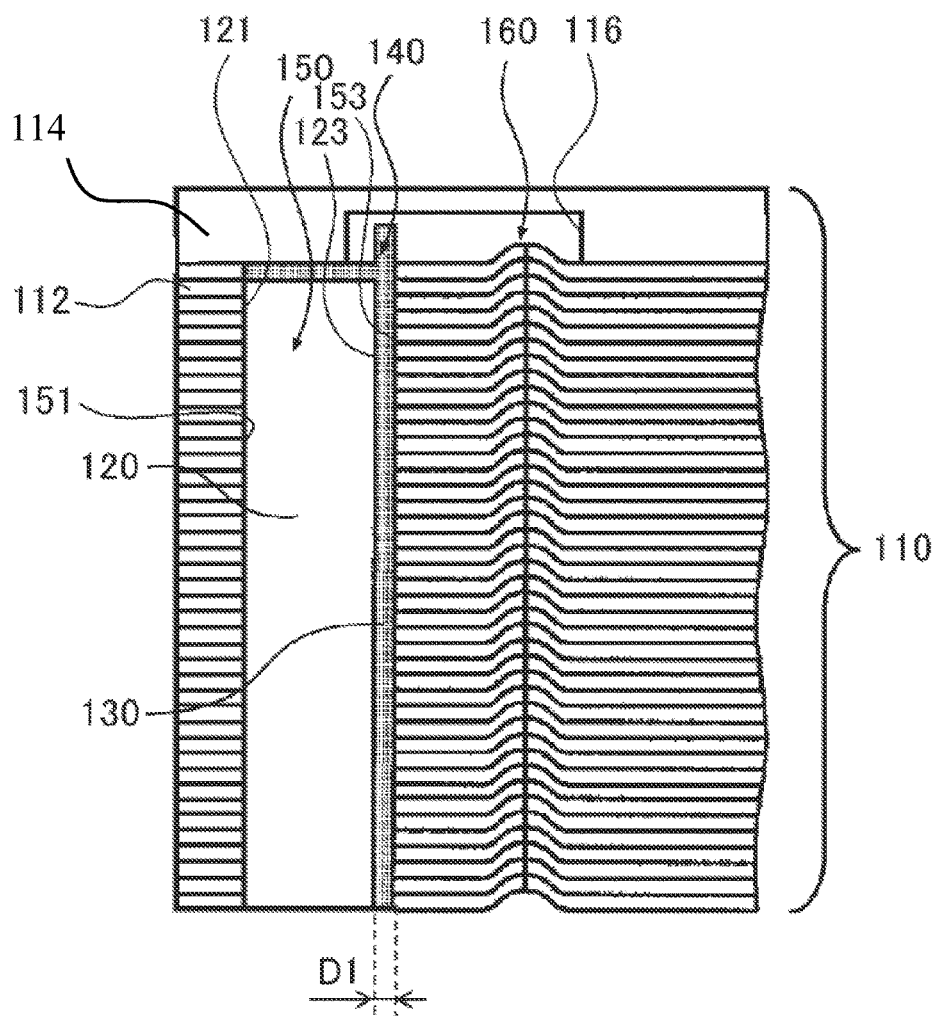
FIG. 4 is a cross-sectional view schematically showing a part of the rotor according to an embodiment of the present invention.

FIG. 1 is a top view of the rotor according to an embodiment of the present invention. FIG. 3 is an enlarged view of a part of the rotor according to an embodiment of the present invention. FIG. 4 is a cross-sectional view of a part of the rotor according to an embodiment of the present invention. The rotor 100 of the present embodiment includes a rotor core 110, a magnet 120, and a fixing member 130. The rotor core 110 has a laminate formed by lamination of a plurality of plate members (electromagnetic steel plates). The rotor core 110 is fixed and installed on a rotating shaft (shaft 170). Further, in the rotor core 110, a plurality of hole portions 150 arranged along the peripheral portion of the rotating shaft are provided in the laminate. The magnet 120 is inserted in the hole portions 150. The fixing member 130 is formed by curing the fixing resin composition, filled in the separation portion between the hole portion 150 and the magnet 120.

The rotor core 110 is constituted by lamination of a plurality of electromagnetic steel plates (steel plates 112) which are magnetic bodies in the thin plate shape. In the rotor core 110, a through hole for inserting the shaft 170 is provided. This rotor core 110 may be in, for example, s cylindrical shape. The shape seen from the upper surface of the rotor core 110 is not particularly limited, but may be, for example, circular, polygonal, or the like. In addition, a plurality of electromagnetic steel plates are joined to each other by a caulking portion 160. Further, the electromagnetic steel plate is constituted with, for example, iron and iron alloys. In addition, an end plate 114 is provided in the end portion in the axial direction of the rotor core 110. In addition, grooves 116 for avoiding interference with the caulking portion 160 and the opening portion of the filling portion 140 may be formed in the end plate 114.

A plurality of hole portions 150 (or a hole portion group constituted with a plurality of hole portions) are arranged in the rotor core 110 to build point symmetry around the center of the axial core of the rotating shaft. The number of the hole portions 150 is not particularly limited, but it is, for example, 2″ or 3″ (wherein n is a natural number, for example, in the range from 2 to 5). The magnet 120 is inserted into the respective hole portions 150. The hole portions 150 may be configured to conform the shape of the magnet 120 and may have a margin (gap portion) around the corner of the magnet 120, for example.

Figure 6:
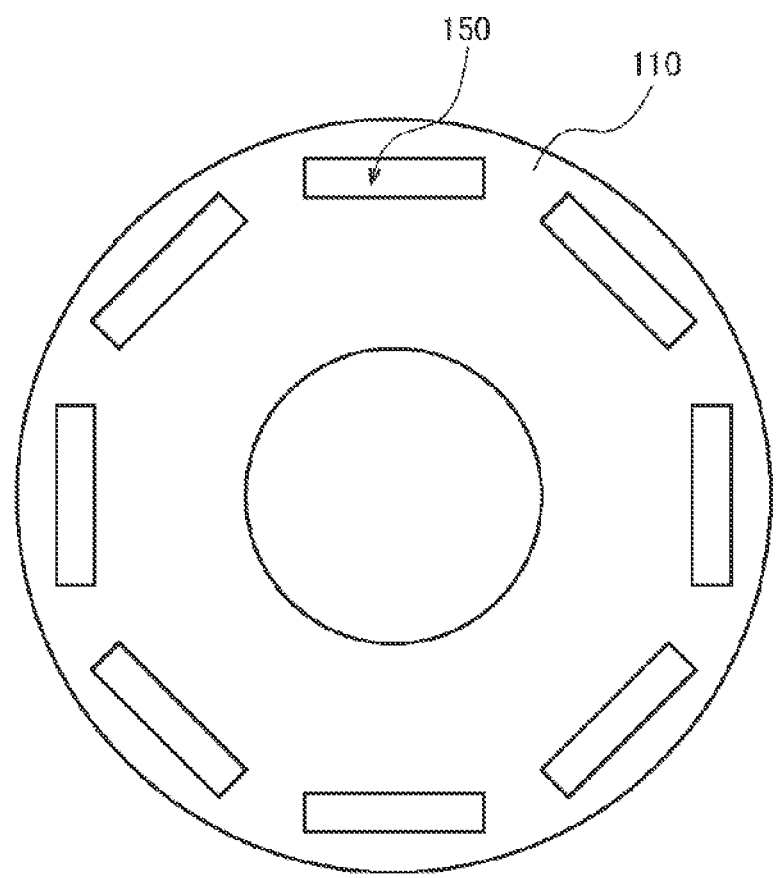
FIG. 6 is a top view schematically showing a rotor according to a modification.
Figure 7:
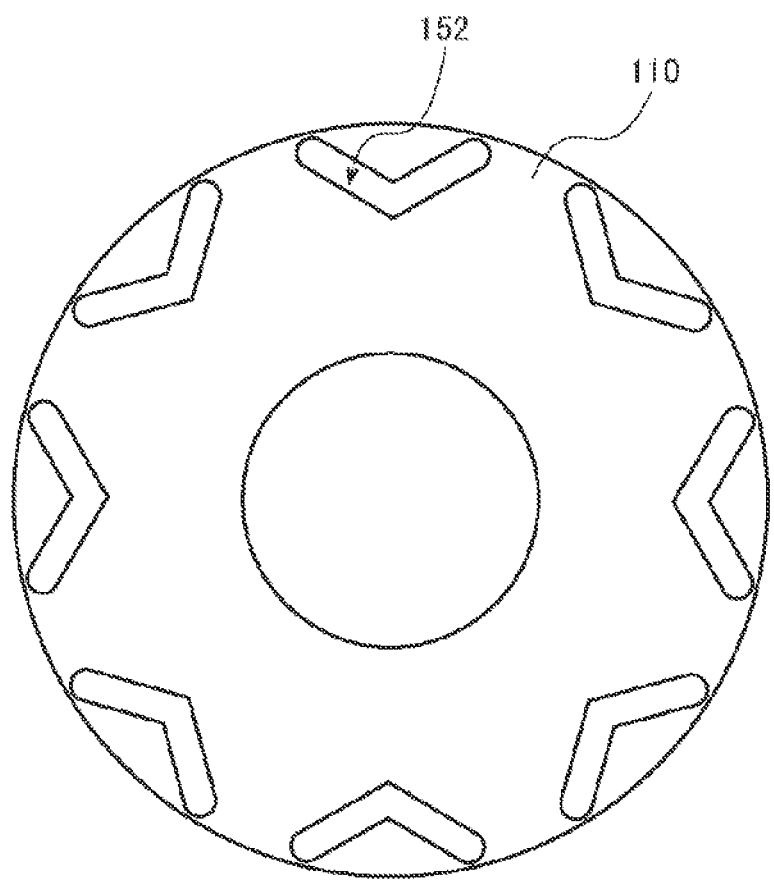
FIG. 7 is a top view schematically showing a rotor according to a modification.
Figure 8:
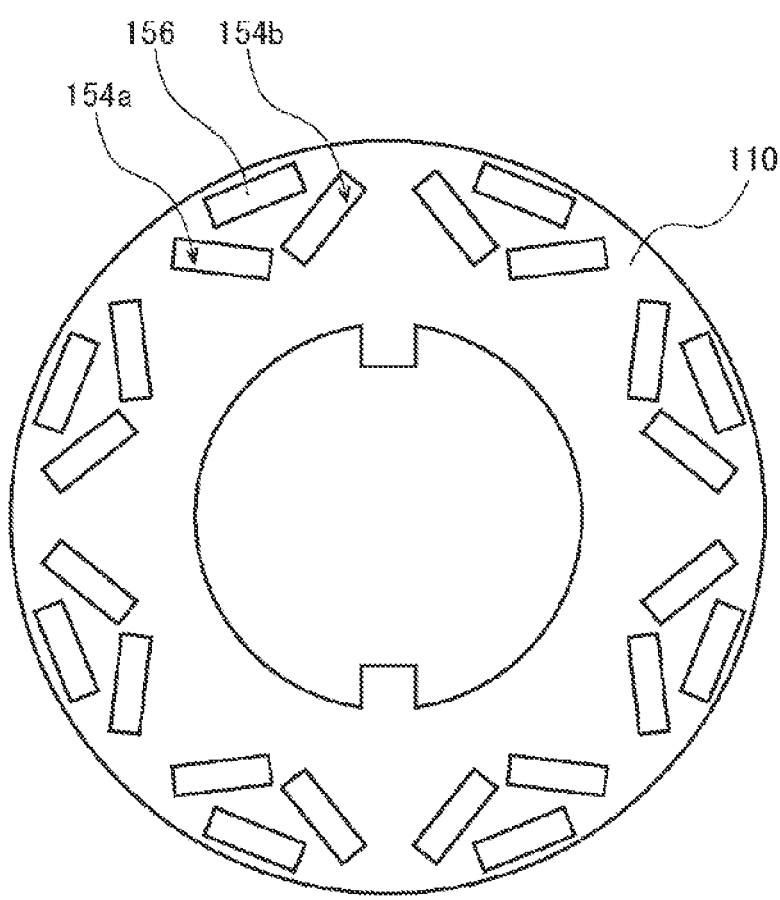
FIG. 8 is a top view schematically showing a rotor according to a modification.

The arrangement layout of the hole portions 150 is not limited to the embodiment shown in FIG. 1, and any of various arrangement layouts shown in FIGS. 6 to 8 may be employed. One set of a hole portion group including two or three hole portions 150 may be arranged along the peripheral portion of the rotating shaft. As shown in FIG. 1, the respective hole portion groups are separated from each other and may be constituted with two hole portions arranged in the V shape. Further, as shown in FIG. 8, the hole portion group may be constituted with the hole portions 154a and 154b, and the hole portions 156 formed between these hole portions 154a and 154b. Further, as shown in FIG. 7, the hole portions arranged in the V shape may be communicated to form one hole portion 152. In addition, as shown in FIG. 6, the hole portions 150 may be arranged such that the hole portions 150 are arranged to be separated from each other in the position orthogonal to the direction perpendicular to the shaft surface.

Furthermore, the magnet 120 may be fixed to the inside of the hole portions 150. For example, as shown in FIGS. 3 and 4, the magnet 120 may be fixed to the side wall 151 positioned on the outer peripheral side of the rotor core 110 in the side wall of the hole portions 150. That is, the side wall 121 of the magnet 120 may be in contact with the side wall 151 of the hole portion 150. In other words, the fixing resin composition according to the present invention may be filled in the separation portion (filling portion 140) between a side wall other than the side wall 151 of the hole portions 150 and the magnet 120. This fixing resin composition is cured to form a fixing member 130. The fixing member 130 may be provided between a corner of the hole portion 150 and the magnet 120. Here, for example, a permanent magnet such as a neodymium magnet may be used as the magnet 120.

In FIGS. 3 and 4, the side wall 153 represents one positioned on the side of the inner peripheral circle of the rotor core 110 in the side walls of the hole portion 150. Further, the side walls 123 represents one facing the side wall 153 of the hole portion 150 in the side walls of the magnet 120.

In the present embodiment, as shown in FIG. 3 or 4, the spacing width D1 of a gap in the diameter direction between the hole portion 150 and the magnet 120 in the rotor core 110 is defined as a distance from the side wall 153 of the hole portion 150 to the side wall 123 of the magnet 120. In the case where the gap exists, the spacing width D1 is preferably equal to or more than 20 μm and equal to or less than 500 μm, and more preferably equal to or more than 50 μm and equal to or less than 300 μm. By setting this spacing width D1 within the range, the rotor can be provided with good mechanical strength.

The present inventor has investigated, and as a result, it has been proved that unfilling of resins easily occurs in a region having a narrow width.

To the contrary, by using the fixing resin composition of the present invention, which has excellent filling properties, generation of unfilling of resins can be inhibited in a region having a narrow width. Thus, since the fixing member 130 is well charged in a gap between the hole portion 150 and the magnet 120, the potency of the rotor 100 can be improved. Accordingly, it becomes to reduce the noise generated from the rotor during rotation.

Figure 5:
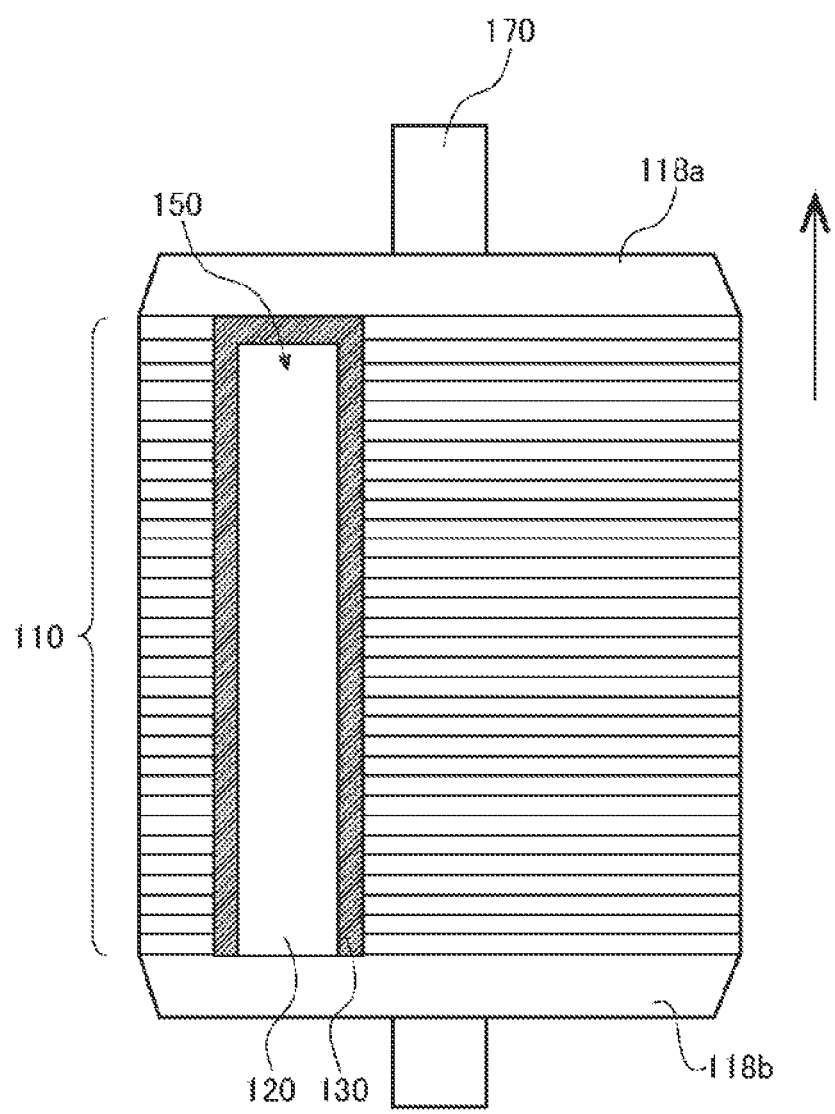
FIG. 5 is a cross-sectional view schematically showing a rotor according to an embodiment of the present invention.

As shown in FIG. 5, the end plates 118a and 118b may be fixed by welding or the like to the shaft 170. Further, in the hole portions 150, the fixing member 130 may not be formed on the side wall of the magnet 120 on the outer peripheral side, but as shown in FIG. 5, the fixing member 130 may be formed on both side walls of the magnet 120 on the outer peripheral side and the inner peripheral side.

Hereinbelow, the respective components of the fixing resin composition, constituting the rotor 100 of the present invention, will be described.

This fixing resin composition is used to form rotors or formation of vehicles which are provided with rotors. That is, the fixing resin composition is used to fixing a magnet arranged in the hole portions formed in a rotor core constituted with an electromagnetic steel plate.

(Fixing Resin Composition)

The fixing resin composition according to the present invention includes a thermosetting resin (A) containing an epoxy resin, a curing agent (B), and an inorganic filler (C).

In this fixing resin composition, the ICI viscosity at 150° C. of the epoxy resin is specified to be equal to or less than 3 poises. Further, for this fixing resin composition, when the fixing resin composition is injected into a flow passage having a cross-sectional shape with a width of 3 mm and a thickness of 80 μm under the conditions of a mold temperature of 175° C., a molding pressure of 6.9 MPa, and an injection time of 20 seconds, the slit flow length is equal to or more than 75 mm. Here, the slit flow length is preferably equal to or more than 75 mm and equal to or less than 300 mm, and more preferably equal to or more than 80 mm and equal to or less than 300 mm.

[Thermosetting Resin (A)]

First, the thermosetting resin (A) will be described.

The thermosetting resin (A) is not particularly limited, but an epoxy resin (A1), an oxetane resin, a (meth)acrylate resin, an unsaturated polyester resin, a diallyl phthalate resin, a maleimide resin, or the like is used. Among these, the epoxy resin (A1), which has excellent curability, storability, and heat resistance, and moisture resistance and chemical resistance of a cured product, is suitably used.

The thermosetting resin (A) according to the present invention includes an epoxy resin (A1). Examples of the epoxy resin (A1) include those having two or more epoxy groups in one molecule.

The molecular weight or structure of the epoxy resin is not particularly limited, but it is preferable that the molecular weight or structure reducing the viscosity of the fixing resin composition. In the ICI viscosity at 150° C. of the epoxy resin (A1), the upper limit is equal to or less than 3 poises, and preferably equal to or less than 1.5 poises. The lower limit is not particularly limited, but is preferably equal to or more than 0 poise, and more preferably equal to or more than 0.01 poises. By this, it becomes possible to improve the filling properties of the fixing resin composition, and thus, even in the case where the gap between the hole portion and the magnet is narrow, the contact area between the steel plates and the magnet can be sufficiently secured. Thus, it becomes possible to provide high mechanical strength.

Furthermore, examples of the epoxy resin (A1) include phenolaralkyl type epoxy resins such as a biphenyl type epoxy resin, a phenolaralkyl type epoxy resin having a biphenylene skeleton, a phenolaralkyl type epoxy resin having a phenylene skeleton, a naphtholaralkyl type epoxy resin having a phenylene skeleton, and a phenolaralkyl type epoxy resin having a methoxynaphthalene skeleton; bisphenol type epoxy resins such as a phenolnovolacepoxy resin, an orthocresol novolac type epoxy resin, a bisphenol A type epoxy resin, a bisphenol F type epoxy resin, a bisphenol S type epoxy resin, and a tetramethyl bisphenol type epoxy resin; a bisnaphthol type epoxy resin, a dicyclopentadiene type epoxy resin, a dihydroanthracenediol type epoxy resin, and a triphenylmethane type epoxy resin.

Among these, the epoxy resin (A1) is preferably an epoxy resin having crystallinity, such as a biphenyl type epoxy resin and a bisphenol type epoxy resin, as well as a phenolaralkyl type epoxy resin having a phenylene skeleton, a phenolaralkyl type epoxy resin having a biphenylene skeleton, and a triphenylmethane type epoxy resin. These may be used singly or in combination of two or more kinds thereof.

The amount of the thermosetting resin (A) according to the present invention is not particularly limited, but is preferably equal to or more than 5% by mass and equal to or less than 40% by mass, and more preferably equal to or more than 7% by mass and equal to or less than 20% by mass, based on 100% by mass of the total amount of the fixing resin composition.

In a preferred embodiment including the epoxy resin (A1) according to the present invention, the lower limit of the amount of the epoxy resin is not particularly limited, but is preferably equal to or more than 70% by mass and equal to or less than 100% by mass, and more preferably equal to or more than 80% by mass and equal to or less than 100% by mass, based on 100% by mass of the thermosetting resin (A).

[Curing Agent (B)]

Next, the curing agent (B) will be described. The curing agent (B) is used to dimensionally bridge the epoxy resin (A1) included in the thermosetting resin (A). The curing agent (B) is not particularly limited, but is preferably one reducing the viscosity of the fixing resin composition. The curing agent (B) has, for example, an upper limit of the ICI viscosity at 150° C. of preferably equal to or less than 2 poises, more preferably equal to or less than 1.8 poises, and even more preferably equal to or less than 1.7 poises. The lower limit is not particularly limited, but is preferably equal to or more than 0 poise, and more preferably equal to or more than 0.01 poises.

In addition, the curing agent (B) may be for example, a phenolic resin such as a novolac type phenolic resin, a phenolaralkyl resin having a phenylene skeleton, a phenolaralkyl resin having a biphenylene skeleton, a naphtholaralkyl resin having a phenylene skeleton, a phenolic resin mainly formed of reaction products of hydroxybenzaldehyde, formaldehyde, and phenol, and a copolymer of a triphenylmethane type phenol compound and a novolac type phenol compound. These may be used singly or in combination of two or more kinds thereof. These phenolic resin-based curing agents are preferred from the viewpoint of achieving a balance in flame resistance, moisture resistance, electrical properties, curability, storage stability, and the like. In particular, in term of curability, the equivalents of the hydroxyl groups in the phenolic resin-based curing agent may be, for example, equal to or more than 90 g/eq and equal to or less than 250 g/eq.

Further, examples of the curing agent used in combination with others include a polyaddition type curing agent, a catalyst type curing agent, and a condensation type curing agent.

Examples of the polyaddition type curing agent include polyamine compounds including aliphatic polyamines such as diethylenetriamine (DETA), triethylenetetramine (TETA), and methaxylenediamine (MXDA), and aromatic polyamines such as diaminodiphenylmethane (DDM), m-phenylenediamine (MPDA), and diaminodiphenylsulfone (DDS), as well as dicyandiamides (DICY) and organic acid dihydrazides; acid anhydrides including alicyclic acid anhydrides such as hexahydrophthalic anhydride (HHPA) and methyltetrahydrophthalic anhydride (MTHPA), and aromatic acid anhydrides such as trimellitic anhydride (TMA), pyromellitic anhydride (PMDA), and benzophenonetetracarboxylic acid (BTDA); polyphenol compounds such as a novolac type phenolic resin and a phenol polymer; polymercaptan compounds such as a polysulfide, a thioester, and a thioether; isocyanate compounds such as a isocyanate prepolymer and a blocked isocyanate; and organic acids such as a carboxylic acid-containing polyester resin.

Examples of the catalyst type curing agent include tertiary amine compounds such as benzyldimethylamine (BDMA) and 2,4,6-trisdimethylaminomethylphenol (DMP-30); imidazole compounds such as 2-methylimidazole and 2-ethyl-4-methylimidazole (EMI24); and Lewis acids such as a BF3 complex.

Examples of the condensation type curing agent include methylol group-containing phenolic resins such as a resol resins; urea resins such as a methylol group-containing urea resin; and melamine resins such as a methylol group-containing melamine resin.

In the case of using such other curing agents in combination with others, the lower limit of the amount of the phenolic resin-based curing agent is preferably, equal to or more than 20% by mass, more preferably equal to or more than 30% by mass, and particularly preferably equal to or more than 50% by mass, based on the entire curing agent (B). When the blending ratio is within the above range, the good flowability can be exhibited while maintaining flame resistance. In addition, the upper limit of the amount of the phenolic resin-based curing agent is not particularly limited, but is preferably equal to or less than 100% by mass, based on the entire curing agent (B).

The lower limit of the amount of the curing agent (B) in the fixing resin composition according to the present invention is not particularly limited, but is preferably equal to or more than 3% by mass, and more preferably equal to or more than 3.5% by mass, based on 100% by mass of the total amount of the fixing resin composition. If the lower limit of the blending ratio is within the above range, good curability is obtained. Further, the upper limit of the amount of the curing agent (B) in the fixing resin composition according to the present invention is also not particularly limited, but is preferably equal to or less than 35% by mass, and more preferably equal to or less than 15% by mass, based on 100% by mass of the total amount of the entire fixing resin composition.

Incidentally, it is preferable that the phenolic resin as the curing agent (B) and the epoxy resin be mixed such that the equivalent ratio (EP)/(OH) of the number of epoxy groups (EP) in the total thermosetting resin (A) to the number of phenolic hydroxyl groups (OH) in the entire phenolic resin is equal to or more than 0.8 and equal to or less than 1.3. When the equivalent ratio is within the above range, sufficient curing properties may be obtained during molding of the obtained fixing resin composition.

[Inorganic Filler (C)]

As the inorganic filler (C) used in the fixing resin composition according to the present invention, inorganic fillers that are generally used in the technical field of fixing resin compositions can be used. Examples thereof include fused silica such as fused crushed silica and fused spherical silica; crystalline silica, alumina, kaolin, talc, clay, mica, rock wool, wollastonite, glass powder, glass flakes, glass beads, glass fibers, silicon carbide, silicon nitride, aluminum nitride, carbon black, graphite, titanium dioxide, calcium carbonate, calcium sulfate, barium carbonate, magnesium carbonate, magnesium sulfate, barium sulfate, cellulose, aramid, wood, and pulverized powder obtained by pulverizing the cured products of phenolic resin molding materials or epoxy resin molding materials. Among these, silica such as fused crushed silica, fused spherical silica, and crystalline silica is preferably used, and fused spherical silica is more preferably used. Further, among these, calcium carbonate is preferable in terms of cost. The inorganic filler (C) may be used singly or in combination of two or more kinds thereof.

The average particle diameter $D_{50}$ of the inorganic filler (C) is preferably equal to or more than 0.01 μm and equal to or less than 75 μm, and more preferably equal to or more than 0.05 μm and equal to or less than 50 μm. By setting the average particle diameter of the inorganic filler (C) to be within the above ranges, the fillability into the separation portion (filling portion) between the hole portion and the magnet is improved. Further, by setting the upper limit of the average particle diameter of the inorganic filler (C) to upper limit equal to or less than 75 μm, the fillability is further improved.

The average particle diameter $D_{50}$ is defined as a volume-conversion average particle diameter by a RODOS SR type laser diffraction measurement device (SYMPATEC HEROS&RODOS).

Moreover, in the fixing resin composition according to the present invention, the inorganic filler (C) may contain two or more kinds of spherical silica having different average particle diameters $D_{50}$. By this, both improvement of flowability and fillability and inhibition of generating burr can be satisfied.

The amount of the inorganic filler (C) is preferably equal to or more than 50% by mass, more preferably equal to or more than 60% by mass, even more preferably equal to or more than 65% by mass, and particularly preferably equal to or more than 75% by mass, based on 100% by mass of the total amount of the fixing resin composition. When the lower limit is within the above ranges, an increase in the moisture absorption and a decrease in the strength, accompanied by curing of the obtained fixing resin composition, can be reduced. Further, the amount of the inorganic filler (C) is preferably equal to or less than 93% by mass, more preferably equal to or less than 91% by mass, and even more preferably equal to or less than 90% by mass, based on 100% by mass of the total amount of the fixing resin composition. If the upper limit is within the above ranges, the obtained fixing resin composition has good flowability as well as good moldability. Therefore, the preparation stability of the rotor increases, and thus, a rotor having an excellent balance between yield and durability is obtained.

Furthermore, the present inventor has investigated, and as a result, by setting the amount of the inorganic filler (C) to equal to or more than 50% by mass, the difference in linear expansions between the fixing member and the electromagnetic steel plate decreases, and thus, it is proved that at varying temperatures, the modification of electromagnetic steel plate and the deterioration of the rotation properties of the rotor are inhibited. Therefrom, a rotor having excellent duration of the rotation properties, in particular, among the durability, is achieved.

Moreover, in the case where silica such as fused crushed silica, fused spherical silica, and crystalline silica is used as the inorganic filler (C), the amount of the silica is preferably equal to or more than 40% by mass, and more preferably equal to or more than 60% by mass, based on 100% by mass of the total amount of the fixing resin composition. If the lower limit is within the above range, a good balance between the flowability and the thermal expansion rate is obtained.

Incidentally, in the case where a metal hydroxide such as aluminum hydroxide and magnesium hydroxide, or an inorganic flame retardant such as zinc borate, zinc molybdate, and antimony trioxide, as described below, is used in combination with the inorganic filler (C), the total amount of the inorganic flame retardant and the inorganic filler is preferably within the above range of the amount of the inorganic filler (C).

In addition, in Examples of the present application as described later, the sum of the inorganic filler and the inorganic flame retardant such as aluminum hydroxide is equal to or more than 80% by mass, based on 100% by mass of the total amount of the fixing resin composition. However, in the present invention, in order to appropriately adjust the flowability and the linear expansion coefficient linear expansion coefficient according to the members used in a rotor, the amount of the inorganic filler may be decreased, and the amount of the resin material may also be increased.

[Other Components]

The fixing resin composition according to the present invention may include a curing accelerator (D). The curing accelerator (D) may be any one which promotes the reaction between an epoxy group of the epoxy resin and a hydroxyl group of the phenolic resin-based curing agent (B), and a curing accelerator (D) generally used can be used.

Specific examples of the curing accelerator (D) include phosphorous atom-containing compounds such as an organic phosphine, a tetra-substituted phosphonium compound, a phosphobetaine compound, an adduct of a phosphine compound and a quinone compound, and an adduct of a phosphonium compound and a silane compound; nitrogen-containing compounds, typically such as amidine-based compounds such as 1,8-diazabicyclo(5,4,0) undecene-7 and imidazole; tertiary amines such as benzyldimethylamine; and amidinium salts or ammonium salts, that are quaternary onium salts of the above compounds. Among these, phosphorous atom-containing compounds are preferred from the viewpoint of curability; curing accelerators having latency such as a tetra-substituted phosphonium compound, a phosphobetaine compound, an adduct of a phosphine compound and a quinone compound, and an adduct of a phosphonium compound and a silane compound are more preferred from the viewpoint of a balance between flowability and curability; and a tetra-substituted phosphonium compound is particularly preferred in view of flowability; a phosphobetaine compound, and an adduct of a phosphine compound and a quinone compound is particularly preferred from the viewpoint of soldering resistance; an adduct of a phosphonium compound and a silane compound is particularly preferred from the viewpoint of latent curability; a tetra-substituted phosphonium compound is preferred from the viewpoint of continuous moldability; and an organic phosphine and a nitrogen atom-containing compound are also suitably used in view of cost.

Examples of the organic phosphine which may be used to form the fixing resin composition according to the present invention include primary phosphines such as ethylphosphine and phenylphosphine; secondary phosphines such as dimethylphosphine and diphenylphosphine; and tertiary phosphines such as trimethylphosphine, triethylphosphine, tributylphosphine and triphenylphosphine.

Examples of the tetra-substituted phosphonium compound which may be used as the fixing resin composition according to the present invention include a compound represented by the following general formula (1).

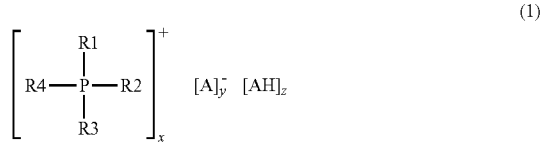

In the general formula (1), P represents a phosphorus atom; R1, R2, R3, and R4 each independently represents an aromatic group or an alkyl group; A represents an anion of an aromatic organic acid in which at least one functional group selected from a hydroxyl group, a carboxyl group, and a thiol group is contained in an aromatic ring; AH represents an aromatic organic acid in which at least one functional group selected from a hydroxyl group, a carboxyl group, and a thiol group is contained in an aromatic ring; x and y are each an integer of 1 to 3; z is an integer of 0 to 3; and x=y.

The compound represented by the general formula (1) is obtained, for example, in the following manner, but is not limited thereto. First, a tetra-substituted phosphonium halide, an aromatic organic acid, and a base are added to an organic solvent and uniformly mixed to produce an aromatic organic acid anion in the solution system. Subsequently, water is added to the solution, and thus the compound represented by the general formula (1) may be precipitated. In the compound represented by the general formula (1), R1, R2, R3, and R4 bonded to a phosphorus atom are each preferably a phenyl group, AH is preferably a compound having a hydroxyl group on its aromatic ring, that is, a phenol compound, and A is preferably an anion of the phenol compound, each from the viewpoint of an excellent balance between the yield during the synthesis and the cure promoting effect. Further, the phenol compound includes, within its concept, monocyclic phenol, cresol, cathecol, resorcin, fused polycyclic naphthol, dihydroxynaphthalene, bisphenol A, bisphenol F, bisphenol S, biphenol, phenylphenol, phenol novolac, and the like, which include a plurality of aromatic rings (polycyclic), and among these, a phenol compound having two hydroxyl groups are preferably used.

Examples of the phosphobetaine compound which may be used as the fixing resin composition according to the present invention include a compound represented by the following general formula (2).

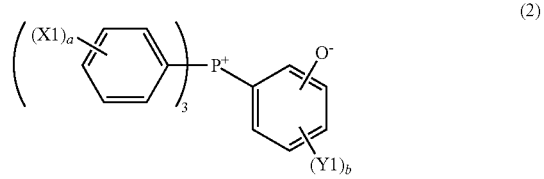

In the general formula (2), X1 represents an alkyl group having 1 to 3 carbon atoms; Y1 represents a hydroxyl group; a is an integer of 0 to 5; and b is an integer of 0 to 4.

The compound represented by the general formula (2) is obtained, for example, in the following manner. First, it is obtained through a step in which a triaromatic-substituted phosphine, which is a tertiary phosphine, is brought into contact with a diazonium salt to substitute the triaromatic-substituted phosphine and a diazonium group of the diazonium salt, but is not limited to this.

Examples of the adduct of a phosphine compound and a quinone compound which may be used as the fixing resin composition according to the present invention include a compound represented by the following general formula (3).

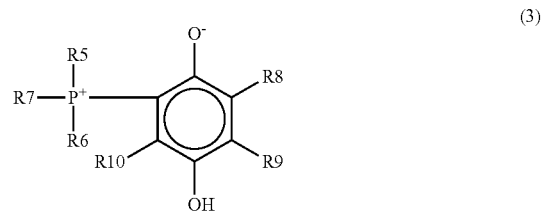

In the general formula (3), P represents a phosphorus atom; R5, R6, and R7 each independently represents an alkyl group having 1 to 12 carbon atoms or an aryl group having 6 to 12 carbon atoms; R8, R9, and R10 each independently represent a hydrogen atom or a hydrocarbon group having 1 to 12 carbon atoms; and R8 and R9 may be bonded to each other to form a ring.

Preferable examples of the phosphine compound used to form the adduct of a phosphine compound and a quinone compound include triphenylphosphine, tris(alkylphenyl) phosphine, tris(alkoxyphenyl)phosphine, trinaphthylphosphine, and tris(benzyl)phosphine, each of which contains an unsubstituted aromatic ring or an aromatic ring having a substituent such as an alkyl group or an alkoxy group. Examples of the substituent such as an alkyl group and an alkoxy group include ones having 1 to 6 carbon atoms. From the viewpoint of easy availability, triphenylphosphine is preferable.

Further, examples of the quinone compound used to form the adduct of a phosphine compound and a quinone compound include o-benzoquinone, p-benzoquinone, and anthraquinones, and among these compounds, p-benzoquinone is preferable from the viewpoint of storage stability.

In a method of producing an adduct of a phosphine compound and a quinone compound, an organic tertiary phosphine is brought into contact with a benzoquinone in a solvent that can dissolve both the organic tertiary phosphine and the benzoquinone, and mixed to produce an adduct thereof. Any solvent which has a low solubility of the adduct therein, such as ketones such as acetone and methyl ethyl ketone, may be used, but is not limited thereto.

In the compound represented by the general formula (3), R5, R6, and R7, all of which are bonded to a phosphorus atom, are preferably a phenyl group, and R8, R9, and R10 are each preferably a hydrogen atom. That is, a compound produced by adding 1,4-benzoquinone to triphenylphosphine is preferable, because the compound decreases the elastic modulus during heating of a cured product of the fixing resin composition.

Examples of the adduct of a phosphonium compound and a silane compound, which may be used to form the fixing resin composition according to the present invention, include a compound represented by the following general formula (4).

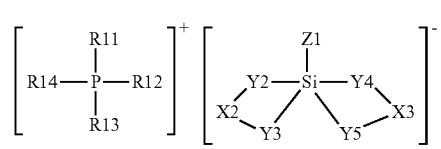

(4)

In the general formula (4), P represents a phosphorus atom; Si represents a silicon atom; R11, R12, R13, and R14 each independently represent an organic group having an aromatic ring or a heterocycle, or an aliphatic group; X2 is an organic group which bonds to groups Y2 and Y3; X3 is an organic group which bonds to groups Y4 and Y5; Y2 and Y3 each independently represent a group formed when a proton-donating group releases a proton, and the groups Y2 and Y3 in the same molecule are bonded to the silicon atom to form a chelate structure; Y4 and Y5 each independently represent a group formed when a proton-donating group releases a proton, and the groups Y4 and Y5 in the same molecule are bonded to the silicon atom to form a chelate structure; X2 and X3 may be the same as or different from each other; Y2, Y3, Y4, and Y5 may be the same as or different from each other; and Z1 is an organic group having an aromatic ring or a heterocycle, or an aliphatic group.

In the general formula (4), examples of R11, R12, R13, and R14 include a phenyl group, a methylphenyl group, a methoxyphenyl group, a hydroxyphenyl group, a naphthyl group, a hydroxynaphthyl group, a benzyl group, a methyl group, an ethyl group, an n-butyl group, an n-octyl group, and a cyclohexyl group. Among these, aromatic groups having a substituent and unsubstituted aromatic groups such as a phenyl group, a methylphenyl group, a methoxyphenyl group, a hydroxyphenyl group, and a hydroxynaphthyl group are more preferable.

Furthermore, in the general formula (4), X2 is an organic group which bonds to Y2 and Y3. Similarly, X3 is an organic group which bonds to groups Y4 and Y5. Y2 and Y3 are each a group formed when a proton-donating group releases a proton, and the groups Y2 and Y3 in the same molecule are bonded to the silicon atom to form a chelate structure. Similarly, Y4 and Y5 are each a group formed when a proton-donating group releases a proton, and the groups Y4 and Y5 in the same molecule are bonded to the silicon atom to form a chelate structure. The groups X2 and X3 may be the same as or different from each other, and the groups Y2, Y3, Y4, and Y5 may be the same as or different from one another. The group represented by —Y2–X2–Y3— and the group represented by —Y4–X3–Y5— in the general formula (4) are each a group formed when a proton donor releases two protons. As the proton donor, an organic acid having at least two carboxyl groups or hydroxyl groups in the molecule is preferable, an aromatic compound having at least two carboxyl groups or hydroxyl groups on carbon constituting the aromatic ring is more preferable, and an aromatic compound having at least two hydroxyl groups on adjacent carbon constituting the aromatic ring is even more preferable. Examples thereof include catechol, pyrogallol, 1,2-dihydroxynaphthalene, 2,3-dihydroxynaphthalene, 2,2'-biphenol, 1,1'-bi-2-naphthol, salicylic acid, 1-hydroxy-2-naphthoic acid, 3-hydroxy-2-naphthoic acid, chloranilic acid, tannic acid, 2-hydroxybenzyl alcohol, 1,2-cyclohexanediol, 1,2-propanediol, and glycerin. Among these, catechol, 1,2-dihydroxynaphthalene and 2,3-dihydroxynaphthalene are more preferred from the viewpoint of a balance between high availability of raw materials and a cure promoting effect.

Furthermore, in the general formula (4), Z1 represents an organic group having an aromatic ring or a heterocycle, or an aliphatic group. Specific examples thereof include aliphatic hydrocarbon groups such as a methyl group, an ethyl group, a propyl group, a butyl group, a hexyl group, and an octyl group; aromatic hydrocarbon groups such as a phenyl group, a benzyl group, a naphthyl group, and a biphenyl group; and reactive substituents such as a glycidyloxypropyl group, a mercaptopropyl group, an aminopropyl group, and a vinyl group. Among these, a methyl group, an ethyl group, a phenyl group, a naphthyl group, and a biphenyl group are more preferable from the viewpoint of thermal stability.

In a method of producing an adduct of a phosphonium compound and a silane compound, a silane compound such as phenyltrimethoxysilane and a proton donor such as 2,3-dihydroxynaphthalene are added to methanol in a flask and dissolved. Next, a sodium methoxide-methanol solution is added dropwise thereto under stirring at room temperature. A solution prepared by dissolving a tetra-substituted phosphonium halide such as tetraphenyl phosphonium bromide in methanol in advance is added dropwise to the resulting reaction product under stirring at room temperature to precipitate crystals. The precipitated crystals are filtered, washed with water, and then dried in vacuum to obtain an adduct of a phosphonium compound and a silane compound. However, the method is not limited thereto.

The lower limit of the amount of the curing accelerator (D) which may be used as the fixing resin composition according to the present invention is preferably equal to or more than 0.1% by mass, based on 100% by mass of the total amount of the fixing resin composition. If the lower limit of the amount of the curing accelerator (D) is within the above range, sufficient curability can be obtained. Further, the upper limit of the amount of the curing accelerator (D) is preferably equal to or less than 3% by mass, and more preferably equal to or less than 1% by mass, based on 100% by mass of the total value of the entire fixing resin composition. If the upper limit of the amount of the curing accelerator (D) is within the above range, sufficient flowability can be obtained.

In the fixing resin composition of the present invention, a compound (E) in which a hydroxyl group is bonded to each of two or more adjacent carbon atoms constituting an aromatic ring (hereinafter sometimes referred to as the "compound (E)") may be further included. For the compound (E) in which hydroxyl group is bonded to each of two or more adjacent carbon atoms constituting an aromatic ring is used, even in the case of using a phosphorous atom-containing curing accelerator having no latency as the curing accelerator (D) used to accelerate a crosslinking reaction between the epoxy resin (A1) and the phenolic resin-based curing agent (B), the reaction of the fixing resin composition during the melt kneading may be suppressed with the use of the compound (E), so that a fixing resin composition can be obtained stably. Furthermore, the compound (E) also has an effect of decreasing the melt viscosity of the fixing resin composition and increasing flowability. Examples of the compound (E) include a monocyclic compound represented by the following general formula (5), a polycyclic compound represented by the following general formula (6) and the like, and these compounds may have a substituent other than a hydroxyl group.

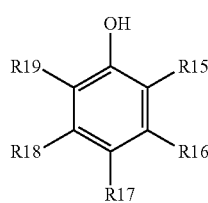

(5)

In the general formula (5), either R15 or R19 is a hydroxyl group, when one of R15 and R19 is a hydroxyl group, the other is a hydrogen atom, a hydroxyl group or a substituent other than a hydroxyl group; and R16, R17, and R18 are each a hydrogen atom, a hydroxyl group or a substituent other than a hydroxyl group.

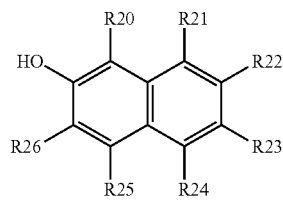

(6)

In the general formula (6), either R20 or R26 is a hydroxyl group, when one of R20 and R26 is a hydroxyl group, the other is a hydrogen atom, a hydroxyl group or a substituent other than a hydroxyl group; and R21, R22, R23, R24, and R25 are each a hydrogen atom, a hydroxyl group, or a substituent other than a hydroxyl group.

Furthermore, specific examples of the monocyclic compound represented by the general formula (5) include catechol, pyrogallol, gallic acid, a gallic acid ester, and a derivative thereof. Further, specific examples of the polycyclic compound represented by the general formula (6) include 1,2-dihydroxynaphthalene, 2,3-dihydroxynaphthalene, and a derivative thereof. Among these compounds, from the viewpoint of ease of control of flowability and curability, preferred is a compound in which a hydroxyl group is bonded to each of two adjacent carbon atoms constituting an aromatic ring. Furthermore, in viewpoint of volatilization in a step of kneading, more preferably used is a compound having, as a mother nucleus, a naphthalene ring, which has low volatility and high weighing stability. In this case, the compound (E) may be specifically, for example, a compound having a naphthalene ring such as 1,2-dihydroxynaphthalene, 2,3-dihydroxynaphthalene, and a derivative thereof. These compounds (E) may be used singly or in combination of two or more kinds thereof.

The lower limit of the amount of the compound (E) is equal to or more than 0.01% by mass, more preferably equal to or more than 0.03% by mass, and particularly preferably equal to or more than 0.05% by mass, based on 100% by mass of the entire fixing resin composition. If the lower limit of the amount of the compound (E) is within the above range, the effects of sufficient low viscosity and improvement of flowability of the fixing resin composition are achieved. Further, the upper limit of the amount of the compound (E) is equal to or less than 2% by mass, more preferably equal to or less than 0.8% by mass, and particularly preferably equal to or less than 0.5% by mass, based on 100% by mass of the entire fixing resin composition. If the upper limit of the amount of the compound (E) is within the above range, there is little risk of reduction in curability and reduction in physical properties of curable products.

In the fixing resin composition according to the present invention, a coupling agent (F) such as a silane coupling agent may be added to improve adhesion between the epoxy resin (A1) and the inorganic filler (C). The coupling agent (F) is any one which undergoes a reaction between the epoxy resin (A1) and the inorganic filler (C) to improve the interfacial strength between the epoxy resin (A1) and the inorganic filler (C), and is not particularly limited. Examples thereof include epoxysilane, aminosilane, ureidosilane, and mercaptosilane. Further, when the coupling agent (F) may be used in combination with the above-mentioned compound (E) to enhance the effect of the compound (E) to reduce the melt viscosity of the fixing resin composition and improve flowability.

Examples of the epoxysilane include γ-glycidoxypropyltriethoxysilane, γ-glycidoxypropyltrimethoxysilane, γ-glycidoxypropylmethyldimethoxysilane, and β-(3,4-epoxycyclohexyl)ethyltrimethoxysilane. Further, examples of the aminosilane include γ-aminopropyltriethoxysilane, γ-aminopropyltrimethoxysilane, N-β(aminoethyl) γ-aminopropyltrimethoxysilane, N-β(aminoethyl) γ-aminopropylmethyldimethoxysilane, N-phenyl γ-aminopropyltriethoxysilane, N-phenyl γ-aminopropyltrimethoxysilane, N-β(aminoethyl) γ-aminopropyltriethoxysilane, N-6-(aminohexyl)-3-aminopropyltrimethoxysilane, and N-(3-(trimethoxysilylpropyl)-1,3-benzenedimethanane. Further, examples of the ureidosilane include γ-ureidopropyltriethoxysilane and hexamethyldisilazane. A product formed by reacting the primary amino site of aminosilane with ketones or aldehydes may be used as a latent aminosilane coupling agent. Further, the aminosilane may have secondary amino group. Further, examples of the mercaptosilane include γ-mercaptopropyltrimethoxysilane and 3-mercaptopropylmethyldimethoxysilane, as well as silane coupling agents which exhibit the same function as a mercapto silane coupling agent by pyrolysis, such as bis(3-triethoxysilylpropyl)tetrasulfide and bis(3-triethoxysilylpropyl)disulfide. Further, this silane coupling agent may be blended after being subjected to a hydrolysis reaction in advance. These silane coupling agents may be used singly or in combination of two or more kinds thereof.

From the viewpoint of continuous moldability, mercaptosilane is preferable; from the viewpoint of flowability, aminosilane is preferable; and from the viewpoint of adhesiveness, epoxysilane is preferable.

The lower limit of the amount of the coupling agent (F) which may be used as the fixing resin composition according to the present invention is preferably equal to or more than 0.01% by mass, more preferably equal to or more than 0.05% by mass, and particularly preferably equal to or more than 0.1% by mass, based on 100% by mass of the entire fixing resin composition according to the present invention. If the lower limit of the amount of the coupling agent (F) such as a silane coupling agent is within the above ranges, good vibration resistance is obtained without lowering the interfacial strength between the epoxy resin (A1) and the inorganic filler (C). Further, the upper limit of the amount of the coupling agent (F) such as a silane coupling agent is preferably equal to or less than 1% by mass, more preferably equal to or less than 0.8% by mass, and particularly preferably equal to or less than 0.6% by mass, based on 100% by mass of the entire fixing resin composition according to the present invention. If the upper limit of the amount of the coupling agent (F) such as a silane coupling agent is within the above range, good vibration resistance is obtained without lowering the interfacial strength between the epoxy resin (A1) and the inorganic filler (C). In addition, if the amount of the coupling agent (F) such as a silane coupling agent is within the above range, good rust resistance is obtained without increasing water absorption of the cured product of the fixing resin composition.

An inorganic flame retardant (G) may be added to the fixing resin composition according to the present invention to improve flame retardancy. Among those, a metal hydroxide or a composite metal hydroxide which can inhibit the combustion reaction through dehydration and heat absorption during combustion is preferable in that the combustion time can be shortened. Examples of the metal hydroxide include aluminum hydroxide, magnesium hydroxide, calcium hydroxide, barium hydroxide, and zirconium hydroxide. The composite metal hydroxide may be a hydrotalcite compound containing two or more kinds of metal elements, in which at least one metal element is magnesium, and other elements are elements selected from calcium, aluminum, tin, titanium, iron, cobalt, nickel, copper, and zinc. As such a composite metal hydroxide, a magnesium hydroxide/zinc solid solution is commercially easily available. Among these, aluminum hydroxide, a magnesium hydroxide/zinc solid solution is preferable from the viewpoint of continuous moldability. The inorganic flame retardants (G) may be used singly or in combination of two or more kinds thereof. Further, in order to reduce the negative effects to continuous moldability, use may be made with a surface treatment using, for example, silicon compounds such as a silane coupling agent or aliphatic compounds such as a wax.

The amount of the inorganic flame retardant (G) according to the present invention is preferably equal to or more than 1% by mass and equal to or less than 20% by mass, and more preferably equal to or more than 3% by mass and equal to or less than 10% by mass, based on 100% by mass of the total amount of the fixing resin composition according to the present invention.

In the fixing resin composition according to the present invention, the upper limit of the concentration of the ionic impurities is preferably equal to or less than 500 ppm, more preferably equal to or less than 300 ppm, and even more preferably equal to or less than 200 ppm, based on the fixing resin composition. The lower limit of the concentration of the ionic impurities is not particularly limited, but is preferably equal to or more than 0 ppb, more preferably equal to or more than 10 ppb, and even more preferably equal to or more than 100 ppb, based on the fixing resin composition according to the present invention. Thus, when the cured product of the fixing resin composition according to the present invention is used to form the fixing member, high rust resistance can be maintained even with a treatment under a high temperature and a high humidity.

The ionic impurities according to the present invention are not particularly limited, but examples thereof include alkali metal ions, alkaline earth metal ions, and halogen ions, and more specifically sodium ions and chlorine ions. The upper limit of the concentration of the sodium ions is preferably equal to or less than 100 ppm, more preferably equal to or less than 70 ppm, and even more preferably equal to or less than 50 ppm, based on the fixing resin composition according to the present invention. Further, the upper limit of the concentration of the chlorine ions is preferably equal to or less than 100 ppm, more preferably equal to or less than 50 ppm, and even more preferably equal to or less than 30 ppm, based on the fixing resin composition according to the present invention. By setting the above range, the corrosion of the electromagnetic steel plate or the magnet can be inhibited.

In the present embodiment, by using, for example, an epoxy resin having high purity, ionic impurities can be reduced. Thus, a rotor having excellent durability is obtained.

The concentration of the ionic impurities can be determined as follows. First, the fixing resin composition according to the present invention is molded and cured at 175° C. for 180 seconds, and then pulverized by a pulverizing machine to obtain powder of a cured product. The obtained powder of the cured product is treated at 120° C. for 24 hours in pure water and ions are extracted in pure water. Then, the concentration of the ionic impurities can be measured by Inductively Coupled Plasma Mass Spectrometry (ICP-MS).

In the fixing resin composition according to the present invention, the upper limit of the amount of alumina is preferably equal to or less than 10% by mass, more preferably equal to or less than 7% by mass, and more preferably equal to or less than 5% by mass, based on 100% by mass of the total amount of the fixing resin composition. The lower limit of the amount of alumina is not particularly limited, but it is preferably, for example, equal to or more than 0% by mass, more preferably equal to or more than 0.01% by mass, and even more preferably equal to or more than 0.1% by mass, based on 100% by mass of the total amount of the fixing resin composition according to the present invention. By setting the amount of alumina to equal to or less than the upper limit, improvement of flowability and reduction in weight and size of the fixing resin composition according to the present invention can be achieved. In addition, in the present embodiment, 0% by mass permits a value within a detection limit.

In the fixing resin composition according to the present invention, in addition to the components described above, ion scavengers such as hydrotalcites and hydrous oxides of elements selected from the magnesium, aluminum, bismuth, titanium, and zirconium; colorants such as carbon black, red iron oxide, and titanium oxide; natural waxes such as a carnauba wax; synthetic waxes such as a polyethylene wax; releasing agents such as higher fatty acids and metal salts thereof, such as stearic acid and zinc stearate, or paraffin; and low-stress agents such as a polybutadiene compound, an acrylonitrile butadiene copolymerization compound, and silicone compounds such as silicone oil and silicone rubber; or the like may be appropriately incorporated.

The amount of the colorant according to the present invention is preferably equal to or more than 0.01% by mass and equal to or less than 1% by mass, and more preferably equal to or more than 0.05% by mass and equal to or less than 0.8% by mass, based on 100% by mass of the total amount of the fixing resin composition according to the present invention. By setting the amount of the colorant within the above range, a step of removing colored impurities is not required, and thus, the workability is improved. Therefore, a rotor having a high yield is achieved.

For the amount of the releasing agent according to the present invention, based on 100% by mass of the total amount of the fixing resin composition according to the present invention, the lower limit is not particularly limited, but it is preferably, for example, equal to or more than 0.01% by mass, and more preferably equal to or more than 0.05% by mass, whereas the upper limit is, for example preferably equal to or less than 1% by mass, more preferably equal to or less than 0.5% by mass, even more preferably equal to or less than 0.2% by mass, and particularly preferably equal to or less than 0.1% by mass. Generally, if a semiconductor chip is transfer-molded, it is known to add a certain amount of a releasing agent to secure the release of a fixing member from a mold. However, if the addition amount of the releasing agent is too high, the adhesiveness between the fixing member and the electromagnetic steel plate may be reduced. Thus, in the present invention, the amount of the releasing agent is preferably low, and particularly preferably equal to or less than 0.2% by mass. From this, the adhesiveness between the fixing member and the electromagnetic steel plate can be enhanced, and thus, a rotor having excellent durability is achieved.

The amount of the low-stress agent according to the present invention is preferably equal to or more than 0.01% by mass and equal to or less than 3% by mass, and more preferably equal to or more than 0.05% by mass and equal to or less than 2% by mass, based on 100% by mass of the total amount of the fixing resin composition according to the present invention.

By using the fixing resin composition of the present invention configured as described above, it becomes possible to improve the filling properties of fixing resin composition. Further, even in the case where the gap between the hole portion and the magnet is narrow, the contact area between the steel plates and the magnet can be sufficiently secured. As a result, it becomes possible to provide the rotor with high mechanical strength. In addition, even when the fixing resin composition is immersed in Automatic Transmission Fluid (ATF), the change rate of the weight and the change rate of the volume between before and after the immersion can be reduced, and thus, the fixing resin composition has very suitable characteristics as a rotor used in automobile.

In the fixing resin composition according to the present invention, when the fixing resin composition is injected into a flow passage having a cross-sectional shape with a width of 3 mm and a thickness of 80 μm under the conditions of a mold temperature of 175° C., a molding pressure of 6.9 MPa, an injection time of 20 seconds, and a curing time of 90 seconds, the lower limit of the slit flow length is preferably equal to or more than 75 mm, more preferably equal to or more than 80 mm, and even more preferably equal to or more than 85 mm, whereas the upper limit is preferably equal to or less than 300 mm. By setting the slit length having a thickness of 80 μm to equal to or more than the lower limit, the filling properties to the gap in a region having a narrow width can be increased. Further, by setting the slit length having a thickness of 80 μm to equal to or less than the upper limit, a large amount of the burr is adhered to the rotor. As a result, when the rotor is rotated, deburring occurs, and thus, it becomes possible for the burrs to inhibit the suppression of rotation of the rotor.

Furthermore, in the present embodiment, for example, the slit flow length can be increased by, for example, decreasing the particle diameter of a filler, or lowering the softening point of the epoxy resin or the curing agent, or decreasing the amount of a curing accelerator.

In the Koka-type viscosity (a Koka-type viscosity is a melt viscosity measured by Koka-type flow tester (a constant-load orifice-type flow tester)) of the fixing resin composition according to the present invention, as measured at a measurement temperature of 175° C. and a load of 10 kg using a Koka-type viscosity measurement device, the lower limit is not particularly limited, but is preferably equal to or more than 3 Pa·s, preferably equal to or more than 5 Pa·s, and even more preferably equal to or more than 6 Pa·s, whereas the upper limit is not particularly limited, but is preferably equal to or less than 50 Pa·s, more preferably equal to or less than 30 Pa·s, and even more preferably equal to or less than 15 Pa·s. If the Koka-type viscosity is equal to or more than the lower limit, generation of voids due to entrainment or the like during molding can be inhibited, whereas if the Koka-type viscosity is equal to or less than the upper limit, good fillability can be obtained. Thus, a rotor having excellent preparation stability is achieved.

In addition, in the present embodiment, the Koka-type viscosity can be decreased by, for example, lowering the softening point of the epoxy resin or the curing agent, using a latent curing accelerator, or using fused spherical silica as a filler.

The gel time of the fixing resin composition according to the present invention at 175° C. is preferably equal to or more than 10 seconds and equal to or less than 50 seconds, and more preferably equal to or more than 15 seconds and equal to or less than 45 seconds. If the gel time is equal to or more than the lower limit, the fillability can be improved, whereas if the gel time is equal to or less than the upper limit, the molding cycle can be accelerated.

Incidentally, in the present embodiment, the gel time can be decreased by, for example, increasing the amount of the curing accelerator. Thus, a rotor having excellent preparation stability is achieved.

The spiral flow of the fixing resin composition according to the present invention is preferably equal to or more than 50 cm, more preferably equal to or more than 60 cm, and even more preferably equal to or more than 80 cm. If the spiral flow is equal to or more than the lower limit, the fillability, in particular the fillability in the vertical direction can be improved. The upper limit of the spiral flow is not particularly limited, but is preferably equal to or less than 250 cm, and more preferably equal to or less than 220 cm. Thus, a rotor having excellent preparation stability is achieved.

Incidentally, in the present embodiment, the spiral flow can be increased by, for example, using fused spherical silica as a filler, lowering the softening point of the epoxy resin or the curing agent, or decreasing the amount of the curing accelerator.

When the cure torque of the fixing resin composition according to the present invention is measured over time at a measurement temperature of 175° C. using a curelastometer, the cure torque value at 60 seconds after measurement initiation is defined as $T_{60}$ and the maximum cure torque value up to 300 seconds after measurement initiation is defined as $T_{max}$, the ratio of the cure torque value at 60 seconds after measurement initiation to the maximum cure torque value up to 300 seconds after measurement initiation, $T_{60}/T_{max}$ (%), is preferably equal to or more than 40%, more preferably equal to or more than 45%, and even more preferably equal to or more than 50%. The upper limit of the ratio of the cure torque values is not particularly limited, but is preferably equal to or less than 100%, and more preferably equal to or less than 95%. If the ratio of the cure torque values is equal to or more than the lower limit, the improvement of productivity can be expected.

Incidentally, in the present embodiment, the ratio of the cure torque values can be increased by, for example, increasing the amount of the curing accelerator. Thus, a rotor having excellent preparation stability is achieved.

For the fixing resin composition according to the present invention, first, a curable product of the fixing resin composition in the dumbbell shape obtained under the curing conditions of a mold temperature of 175° C., an injecting pressure of 9.8 MPa, and a curing time of 120 seconds, and in accordance with JIS K7162 is manufactured. The curable product of the fixing resin composition in the dumbbell shape is cured under the conditions of 175° C. and 4 hours to manufacture a test piece. The test piece is subjected to a tensile test under the conditions of a temperature of 25° C. and a load speed of 1.0 mm/min to obtain break energy. Further, the same shape as the dumbbell shape described in JIS K7162 is described in ISO527-2.

Hereinafter, the break energy obtained when the tensile test is carried out under the conditions of a temperature of 25° C. and a load speed of 1.0 mm/min is defined as break energy a. Further, the break energy obtained when the tensile test is carried out under the conditions of a temperature of 150° C. and a load speed of 1.0 mm/min is defined as break energy b. In addition, the break strength under the condition of measurement of the break energy a is defined as break strength a, and the break strength under the condition of measurement of the break energy b is defined as break strength b.

The break energy is calculated by making a curve (stress-strain curve) graphed from the relationship between the vertical stress and the vertical strain in the tensile test.

Specifically, by taking the strain as a variable, the integral value of the stress from a start point to a break point in the tensile test is calculated. Larger break energy indicates that the obtained rotor core has hardness and tenacity, and the durability is excellent. Further, the unit is $\times 10^{-4}$ J/mm$^3$.

The break energy a in the curable product (fixing member) of the fixing resin composition according to the present invention is preferably equal to or more than $1.5 \times 10^{-4}$ J/mm$^3$. With the break energy a in such a range, a rotor core having excellent durability, including hardness and tenacity, is obtained.

Furthermore, the break energy a is more preferably equal to or more than $1.9 \times 10^{-4}$ J/mm$^3$. With the break energy a in such a range, a rotor core exhibiting sufficient durability can be achieved under an environment for rotation at a high speed and at a high temperature for a long period of time. Further, the upper limit is not particularly limited, but approximately $15.0 \times 10^{-4}$ J/mm$^3$ may be sufficient.

Further, the break energy b is preferably equal to or more than $1.2 \times 10^{-4}$ J/mm$^3$. In the case where the break energy b, measured at a higher temperature as compared with the break energy a, is within the above ranges, a rotor which is resistant to the change in temperatures and having excellent durability, including hardness and tenacity, can be obtained. Further, the break energy b is more preferably equal to or more than $1.5 \times 10^{-4}$ J/mm$^3$. With the break energy b in such a range, the durability during rotation at a high speed is further improved. Similarly to the break energy a, the upper limit of the break energy b is also not particularly limited, but approximately $8.0 \times 10^{-4}$ J/mm$^3$ may be sufficient.

In order to improve the break energy a and b, the following technique will be effective.

First, by using a combination of the epoxy resin and the curing agent according to the present invention, the strength and the tenacity of the resin component can be improved. In addition, it is preferable that the surface of the inorganic filler be modified by a silane coupling agent and the interfacial adhesion strength between the resin and the inorganic filler be improved. In addition, it is more preferable that a particle diameter distribution of the inorganic filler be adjusted, in order to form a structure, in which microcracks generated in the inside of a cured product of the resin do not easily proceed.

The rotor according to the present embodiment makes it possible to improve the durability by controlling the break strength a of curable product (fixing member) of the fixing resin composition according to the present invention to equal to or more than 50 MPa. Specifically, with the break strength a in such a range, the durability during rotation at a high speed is further improved. Further, the break strength a is preferably equal to or more than 60 MPa. The upper limit is not particularly limited, but approximately 200 MPa will be sufficient.

Also, similarly to the break strength a, for the break strength b of the curable product of the fixing resin composition according to the present invention, by controlling the break strength b to a range equal to or more than 15 MPa, the durability during rotation at a high speed is further improved. Further, the break strength b is preferably equal to or more than 20 MPa. The upper limit is not particularly limited, but about 100 MPa will be sufficient.

By setting the break strength a and b to the above-specified ranges, a rotor having excellent durability can be provided. Particularly, a rotor having excellent position stability of a permanent magnet in the use of the rotor during rotation at a high speed can be provided.

For the fixing resin composition according to the present invention, the fixing resin composition is injection-molded under the conditions of a mold temperature of 175° C., an injection pressure of 9.8 MPa, and a curing time of 120 seconds, using a molding device to prepare a molded product of the fixing resin composition, having a length of 80 mm, a width of 10 mm, and a thickness of 4 mm. The molded product is cured under the conditions of 175° C. and 4 hours to prepare a curable product. Thereafter, the curable product is immersed in ATF at 150° C. for 1000 hours. When the weight of the curable product before immersion in ATF is defined as X1 and the weight of the curable product after immersion in ATF is defined as X2, the change rate [%] of the weight is calculated by (X2−X1)/X1×100.

Here, ATF is not particularly limited as it is one generally used, and various additives may be blended in a base oil. The base oil as mentioned herein is commonly mineral oil-based base oil, a synthetic oil-based base oil, or a mixture thereof. Examples of the additive component include viscosity modifier and a friction modifier.

In the present embodiment, as the ATF used to measure the rate of change of weight, for example, Matic Fluid D (manufactured by Nissan Motor Co., Ltd.), Automatic Fluid Type T-IV (manufactured by Toyota Motor Corporation), ATF DW-1 (manufactured by Honda R&D Co., Ltd.), or the like can be used.

For the fixing resin composition according to the present invention, the change rate of the weight when the curable product (fixing member) is immersed in ATF at 150° C. for 1000 hours is preferably equal to or less than 0.5%, and more preferably equal to or less than 0.2%. When the change rate of the weight between before and after the immersion in ATF is equal to or less than the upper limit, even when the fixing member is in contact with a lubricant oil at a high temperature for a long period of time, the fixing member can be inhibited from being swollen greatly by the lubricant oil.

Furthermore, for the fixing resin composition according to the present invention, the change rate of the weight when the curable product is immersed in ATF at 150° C. for 1000 hours is preferably equal to or more than −0.05%, and more preferably equal to or more than −0.03%. When the change rate of the weight between before and after the immersion in ATF is equal to or more than the lower limit, even when the fixing member is in contact with a lubricant oil at a high temperature for a long period of time, a part of the fixing member can be inhibited from being flown into the lubricant oil. Further, when the change rate of the weight between before and after the immersion in ATF is equal to or more than the lower limit, the characteristics of the lubricant oil can be inhibited from being deteriorated.

Therefore, when the change rate of the weight between before and after the immersion in ATF is within the above range, the dimension of the fixing member can be kept constant under the environment for rotation at a high speed and at a high temperature for a long period of time. As a result, since the position of the magnet can be kept constant for a long period of time, a rotor having excellent long-term reliability can be obtained.

Furthermore, in the case where the curable product of the fixing resin composition according to the present invention is immersed in ATF at 150° C. for 2000 hours, when the weight of the curable product after immersion in ATF is defined as X3, the change rate [%] of the weight calculated by (X3−X1)/X1×100 is preferably equal to or more than −0.1% and equal to or less than 0.6%, and more preferably equal to or more than −0.07% and equal to or less than 0.5%. If the change rate of the weight as measured under the conditions is within the above ranges, a rotor having excellent long-term reliability can be obtained even under the environment for rotation at a high speed and at a high temperature for a long period of time.

In addition, in the case where the curable product of the fixing resin composition according to the present invention is immersed in ATF at 150° C. for 1000 hours, when the volume of the curable product before immersion in ATF is defined as Y1 and the volume of the curable product after immersion in ATF is defined as Y2, the change rate [%] of the volume calculated by (Y2−Y1)/Y1×100 is preferably equal to or more than −0.2% and equal to or less than 1.5%, and more preferably equal to or more than −0.1% and equal to or less than 1%. If the change rate of the volume measured under the conditions is within the above ranges, a rotor having excellent long-term reliability can be obtained even under the environment for rotation at a high speed and at a high temperature for a long period of time.

The fixing resin composition according to the present invention may be uniformly mixed at normal temperature using, for example, a mixer, and then, if necessary, melt-kneaded using a kneading machine such as a heating roll, a kneader, and an extruder, and subsequently, if necessary, cooled and pulverized, in order to adjust to a desired degree of dispersion and flowability, or the like.

The preparation method of the fixing resin composition according to the present invention is not particularly limited, but may be carried out in the following manner.

First, a thermosetting resin (A), a phenolic resin-based curing agent (B), and an inorganic filler (C), and preferably other additives or the like are blended in predetermined amounts to obtain a fixing resin composition. Then, the blend is uniformly pulverized and mixed at normal temperature using, for example, a mixer, a jet mill, a ball mill, or the like, and then melt-kneaded using a kneading machine such as a heating roll, a kneader, and an extruder while warming the fixing resin composition to approximately 90° C. to 120° C. Then, the fixing resin composition after kneading is cooled and pulverized to obtain a solid fixing resin composition in the granule or powder shape. The particle size of the powder or granule of the fixing resin composition according to the present invention is preferably, for example, equal to or less than 5 mm. By setting the particle size to equal to or less than 5 mm, generation of filling failure during tableting or increased imbalance in the mass of the tablet can be inhibited.

Moreover, the powder or granule of the obtained fixing resin composition can be tablet-molded to obtain a tablet. As a device used in tablet-molding, a single-shot type or multi-communication rotary tableting machine can be used. The shape of the tablet is not particularly limited, but is preferably cylindrical. The temperature of the male type, the female type, and the environment of the tableting machine is not particularly limited, but is preferably equal to or lower than 35° C. If the temperature exceeds 35° C., the viscosity increases by the reaction of the fixing resin composition, and thus, the flowability may be deteriorated. The tableting pressure is preferably in the range of equal to or more than $400 \times 10^4$ Pa and equal to or less than $3000 \times 10^4$ Pa. By setting the tableting pressure to equal to or less than the upper limit, occurrence of fracture during transporting can be inhibited. On the other hand, since a sufficient aggregation force is not obtained by setting the tableting pressure to equal to or more than the lower limit, occurrence of fracture immediately after the tableting can be inhibited. The material of the male or female mold of the tableting machine and the surface treatment are not particularly limited, and known materials can be used. Further, examples of the surface treatment include electrical discharge processing, coating with a releasing agent, plating treatment, and polishing.

Furthermore, the glass transition temperature (Tg) of the fixing member according to the present invention is preferably equal to or higher than 130° C., and more preferably equal to or higher than 140° C. If the glass transition temperature (Tg) is equal to or higher than the lower limit, the improvement of reliability can be expected. The upper limit of the glass transition temperature (Tg) is not particularly limited, but is preferably equal to or lower than 200° C., and more preferably equal to or lower than 190° C. Thus, a rotor having excellent durability is achieved.

Furthermore, in the present embodiment, the glass transition temperature (Tg) can be increased by, for example, raising the softening point of the epoxy resin or the curing agent.

The flexural strength of the fixing member according to the present invention at 150° C. is preferably equal to or more than 70 MPa, and more preferably equal to or more than 100 MPa. If the flexural strength is equal to or more than the lower limit, cracks are not easily generated and the improvement of reliability can be expected. The upper limit of the flexural strength is not particularly limited, but is preferably equal to or less than 300 MPa, and more preferably equal to or less than 250 MPa. Thus, a rotor having excellent durability is achieved.

Incidentally, in the present embodiment, the flexural strength can be increased by, for example, treating the surface of the filler with a coupling agent.

The upper limit of the flexural elastic modulus of the fixing member according to the present invention at 150° C. is preferably equal to or less than $1.6 \times 10^4$ MPa, and more preferably equal to or lower than $1.3 \times 10^4$ MPa. If the flexural elastic modulus is equal to or less than the upper limit, the improvement of reliability due to stress relaxation can be expected. The lower limit of the flexural elastic modulus is not particularly limited, but is preferably equal to or more than 5000 MPa, and more preferably equal to or more than 7000 MPa. Thus, a rotor having excellent durability is achieved.

In addition, in the present embodiment, the flexural elastic modulus can be decreased by, for example, increasing the addition amount of a low-stress agent or by decreasing the blending amount of the filler.

In a region which is equal to or higher than 25° C. and equal to lower than the glass transition temperature (Tg) of the fixing member according to the present invention, the linear expansion coefficient ($\alpha 1$) is preferably equal to or more than 10 ppm/° C. and equal to or less than 25 ppm/° C., and more preferably equal to or more than 15 ppm/° C. and equal to or less than 20 ppm/° C. Within the above ranges, the difference in the thermal expansion from that of an electromagnetic steel plate is small, and the loss of the magnet can be prevented. Thus, a rotor having excellent durability is achieved.

In addition, in the present embodiment, the linear expansion coefficient ($\alpha 1$) can be decreased by, for example, increasing the blending amount of the filler.

In the region which is equal to or higher than 25° C. and equal to or lower than the glass transition temperature (Tg) of the fixing member according to the present invention, the linear expansion coefficient ($\alpha 2$) is preferably equal to or more than 10 ppm/° C. and equal to or less than 100 ppm/° C., and more preferably equal to or more than 20 ppm/° C. and equal to or less than 80 ppm/° C. Within the above ranges, the difference in the thermal expansion from that of an electromagnetic steel plate is small, and the loss of the magnet can be prevented. Thus, a rotor having excellent durability is achieved.

In addition, in the present embodiment, the linear expansion coefficient ($\alpha 2$) can be decreased by, for example, increasing the blending amount of the filler.

(Method of Manufacturing Rotor)

The method of manufacturing the rotor 100 according to the present embodiment includes a step of preparing the rotor core 110, in which a plurality of hole portions 150 arranged along the peripheral portion of a through hole through which a rotating shaft (shaft 170) is penetrated are formed, a step of inserting a magnet 120 into the hole portion 150, a step of filling a fixing resin composition in a separation portion between the hole portion 150 and the magnet 120, a step of curing the resin composition to obtain a fixing member 130, and a step of inserting the shaft 170 into the through hole of the rotor core 110 while fixing and installing the shaft 170 in the rotor core.

In the present embodiment, in a technique used to fill a fixing resin composition, insert molding is preferably used, which will be described in detail.

First, an insert molding device will be described.

Figure 2:
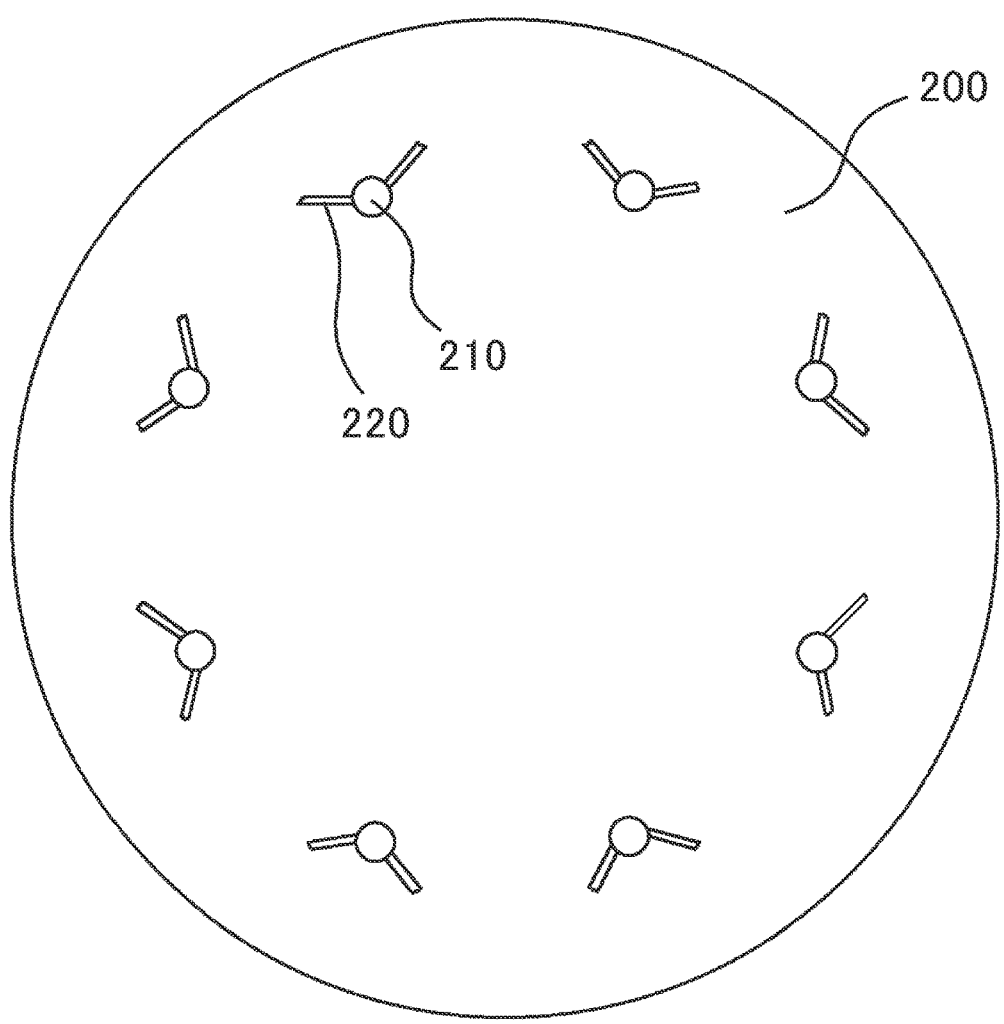
FIG. 2 is a top view schematically showing a mold used in insert molding according to an embodiment of the present invention.

FIG. 2 is a cross-sectional view of an upper mold 200 of an insert molding device used in insert molding.

As one example of a method of forming the fixing member 130, a method involving carrying out insert molding using a fixing resin composition in the tablet shape may be used. For this insert molding, an insert molding device is used. This molding device includes an upper mold 200 having a pot 210 to which a fixing resin composition in the tablet shape is supplied and a flow passage 220 used to transfer the fixing resin composition in the molten state, a lower mold, a heating unit used to heat the upper mold and the lower mold, and an extrusion unit for extruding the fixing resin composition in the molten state. The insert molding device may be provided with, for example, a transporting function of transporting a rotor core or the like.

In the present embodiment, the upper mold 200 and the lower mold are preferably closed to the upper surface and the lower surface of the rotor core 110 (that is, a surface of the electromagnetic steel plate constituting the rotor core 110), and more preferably, it is, for example, in a plate shape. The upper mold 200 and the lower mold of the preset embodiment are different from molds usually used to form a transfer molding which is used in a method of preparing a semiconductor device in that the upper mold 200 and the lower mold do not cover the entire rotor core 110, that is, do not cover, for example, a part on one side. The mold used for the transfer molding is configured such that the entire semiconductor chip is arranged in a cavity constituted with an upper mold and a lower mold.

Furthermore, the pot 210 may have two other flow passages 220, and may have flow passages 220 in the Y shape. Thus, the fixing resin composition according to the present invention can be filled in two hole portions from one pot 210. Further, one pot may have one flow passage used to fill the fixing resin composition in one hole portion, but may have three flow passages used to fill the fixing resin composition in three or more hole portions. Here, a plurality of flow passages may be independent of one another, but may be continuous.

Subsequently, the insert molding according to the present embodiment will be described.

First, a rotor core is preheated in an oven or a heat plate, and then fixed on a lower mold, not shown in the drawing, of a molding device. Subsequently, a magnet is inserted in the hole portions of the rotor core. Subsequently, the lower mold is raised and the upper mold 200 is pressed onto the upper surface of the rotor core. Thus, the upper surface and the lower surface of the rotor core 110 are inserted into the upper mold 200 and the lower mold. At this time, the distal end portion of the flow passage 220 in the upper mold 200 is arranged on the separation portion between the hole portion and the magnet. Further, the rotor core is heated by heat conduction from the lower mold and the upper mold 200 of the molding device. The temperature of the lower mold and the upper mold 200 of the molding device is controlled to, for example, approximately 150° C. to 200° C., which is suitable for molding and curing the fixing resin composition the rotor core. In this state, the fixing resin composition in the tablet shape is supplied into the pot 210 of the upper mold 200. The fixing resin composition in the tablet shape, supplied into the pot 210 of the upper mold 200, is in the molten state by heating it in the pot 210.

Subsequently, the fixing resin composition in the molten state is extruded from the pot 210 by a plunger (extrusion mechanism). Further, the fixing resin composition moves through the flow passage 220, and filled in the separation portion between the hole portion and the magnet. In this course, the rotor core is heated by heat conduction from the mold (the lower mold and the upper mold 200), thereby curing the fixing resin composition filled therein, to form a fixing member. At this time, the temperature condition may be set to, for example, 150° C. to 200° C. Further, the curing time may be set to, for example, 30 seconds to 180 seconds. Thus, the magnet 120 inserted in the hole portion 150 is fixed by the fixing member 130. Thereafter, the upper mold 200 is separated from the upper surface of the rotor core. Then, the shaft 170 is inserted into the through hole of the rotor core 110 while the shaft 170 is fixed and installed in the rotor core.

By this, the rotor of the present embodiment is obtained.

Here, the insert molding method of the present embodiment does not require demolding, which is different from a transfer molding method used to manufacture a semiconductor device.

In the insert molding method, while the upper surface of the rotor core 110 is kept closer to the upper mold 200, the resin passes through the flow passage of the upper mold 200 and is filled in the hole portion of the rotor core 110. As a result, a large amount of the resin is not filled between the upper surface of the rotor core 110 and the upper mold 200, attachment and detachment between the upper mold 200 and the upper surface become easier.

On the other hand, in the transfer molding method, a resin is filled in a cavity between a semiconductor chip and a mold, and thus, it is necessary to perform demolding from the molded article well. As a result, releasability between the mold and the molded article are required, particularly for a resin that encapsulates a semiconductor chip.

The rotor 100 of the present embodiment can be mounted on transportation units, for example, motor vehicles such as hybrid cars, fuel cell cars, and electric vehicles, trains, and boats and ships.

EXAMPLES

Hereinbelow, the present invention will be described in detail with reference to Examples, but the present invention is not limited to the description in Examples in any way. Unless specified otherwise, the "part (s)" and "%" as described below denote "part (s) by mass" and "% by mass", respectively.

The raw material components used in the respective Examples and Comparative Examples are shown below.

(Thermosetting Resin (A))

Epoxy resin 1: Biphenyl type epoxy (manufactured by Mitsubishi Chemical Corporation, YX4000K, ICI viscosity at 150° C.: 0.11 poises)

Epoxy resin 2: Tetramethyl bisphenol F type epoxy resin (manufactured by Nippon Steel & Sumikin Chemical Co., Ltd., YSLV-80 XY, ICI viscosity at 150° C.: 0.03 poises)

Epoxy resin 3: Orthocresol novolac type epoxy resin (manufactured by DIC Corporation, EPICLON N-665, ICI viscosity at 150° C.: 3.06 poises)

Epoxy resin 4: Phenolaralkyl type epoxy having a phenylene skeleton (manufactured by Nippon Kayaku Co., Ltd., NC-2000, ICI viscosity at 150° C.: 1.20 poises)

Epoxy resin 5: Phenolaralkyl type epoxy having a biphenylene skeleton (manufactured by Nippon Kayaku Co., Ltd., NC3000, ICI viscosity at 150° C.: 0.85 poises)

Epoxy resin 6: Triphenylmethane type epoxy resin (manufactured by Nippon Kayaku Co., Ltd., E-1032H-60, ICI viscosity at 150° C.: 1.30 poises)

Epoxy resin 7: Orthocresol novolac type epoxy resin (manufactured by DIC Corporation, EPICLON N-670, ICI viscosity at 150° C.: 4.28 poises)

Further, the melt viscosity (ICI viscosity) at 150° C. was measured with a Cone Plate Type Viscometer CV-1S (manufactured by TOA Industry Inc.)

(Curing Agent (B))

Phenolic resin-based curing agent 1: Novolac type phenolic resin (manufactured by Sumitomo Bakelite Co., Ltd., PR-HF-3, ICI viscosity at 150° C.: 1.08 poises)

Phenolic resin-based curing agent 2: Phenolaralkyl resin having a phenylene skeleton (manufactured by Meiwa Plastic Industries, Ltd., MEH-7800-4S, ICI viscosity at 150° C.: 0.73 poises)

Phenolic resin-based curing agent 3: Phenolaralkyl resin having a biphenylene skeleton (manufactured by Meiwa Plastic Industries, Ltd., MEH-7851SS, ICI viscosity at 150° C.: 0.68 poises)

Phenolic resin-based curing agent 4: Phenolic resin mainly formed of a reaction product of 2-hydroxybenzaldehyde, formaldehyde, and phenol (manufactured by Air Water Inc., HE910-20, ICI viscosity at 150° C.: 1.5 poises)

Phenolic resin-based curing agent 5: Novolac type phenolic resin (manufactured by Sumitomo Bakelite Co., Ltd., PR-51714, ICI viscosity at 150° C.: 1.64 poises)

(Inorganic Filler (C))

Spherical silica 1 (manufactured by Denki Kagaku Kogyo Kabushiki Kaisha, FB-950, average particle diameter $D_{50}$ 23 μm)

Spherical silica 2 (manufactured by Denki Kagaku Kogyo Kabushiki Kaisha, FB-35, average particle diameter $D_{50}$ 10 μm)

Spherical silica 3 (manufactured by Admatechs Co., Ltd., SO-25R, average particle diameter $D_{50}$ 0.5 μm)

Alumina (manufactured by Denki Kagaku Kogyo Kabushiki Kaisha, DAW-45, average particle diameter $D_{50}$ 43 μm)

(Curing Accelerator (D))

Curing accelerator 1: Triphenylphosphine

Curing accelerator 2: Curing accelerator represented by the following formula (7)

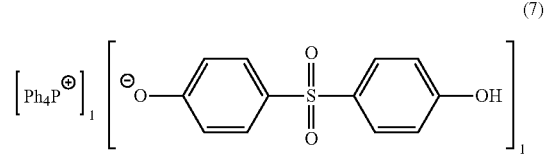

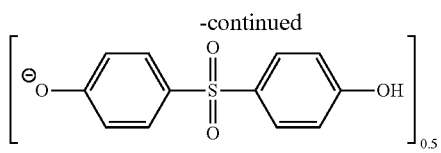

Curing accelerator 3: Curing accelerator represented by the following formula (8)

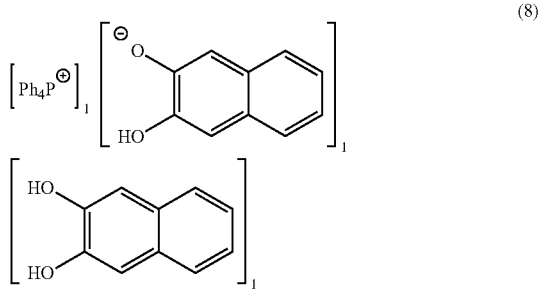

Curing accelerator 4: Curing accelerator represented by the following formula (9)

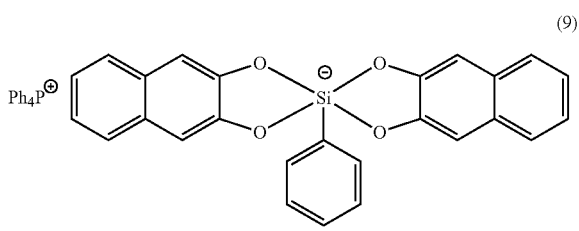 [SMILES: c1ccc([Si-]23(Oc4cc5ccccc5cc4O2)Oc2cc4ccccc4cc2O3)cc1]

Curing accelerator 5: Curing accelerator represented by the following formula (10)

(Coupling Agent (F))

Silane coupling agent 1: Phenylaminopropyltrimethoxysilane (manufactured by Dow Corning Toray Co., Ltd., CF4083)

Silane coupling agent 2: γ-Glicydoxypropyltrimethoxysilane (manufactured by Shin-Etsu Chemical Co., Ltd., KBM-403)

(Inorganic Flame Retardant (G))

Aluminum hydroxide (manufactured by Sumitomo Chemical Co., Ltd., CL-303)

(Other Additives)

Ion Scavenger: Hydrotalcite (manufactured by Kyowa Chemical Industry Co., Ltd., trade name DHT-4H)

Colorant: Carbon black (manufactured by Mitsubishi Chemical Corporation, MA600)

Releasing agent: Ester wax of montanic acid (manufactured by Hoechst AG, Hoechst Wax E)

Low-stress agent 1: Silicone resin (manufactured by Shin-Etsu Chemical Co., Ltd., KMP-594)

Low-stress agent 2: Silicone oil (manufactured by Dow Corning Toray Co., Ltd., TZ-8120)

(Examples)

With respect to Examples and Comparative Examples, the blend formed by blending the respective components according to the blending amounts shown in Tables 1 and 2 was mixed at a normal temperature using a mixer to obtain an intermediate in the powder shape. The obtained intermediate in the powder shape was loaded in an automatic feeder (hopper), supplied quantitatively to a heating roll at 80° C. to 100° C., and melt-kneaded. Thereafter, the intermediate was cooled and then pulverized to obtain a fixing resin composition. The obtained fixing resin composition was tablet-molded using a molding device to obtain a tablet.

On the other hand, a rotor was prepared in the following manner, using an insert molding device provided with an upper mold 200 shown in FIG. 2. First, the rotor core was fixed in the lower mold of a molding device, and subsequently, a neodymium magnet was inserted in the hole portion of a rotor core. Then, the lower mold was raised and the upper mold 200 was pressed onto the upper surface of the rotor core. Subsequently, the fixing resin composition in the tablet shape was supplied to the pot 210 of the upper mold 200, and then the fixing resin composition in the molten state was extruded from the pot 210 by a plunger. The fixing resin composition was filled in a separation portion between the hole portion and a neodymium magnet. Then, the filled fixing resin composition was heated and cured to form a fixing member, thereby obtaining a rotor. Here, the molding conditions were as follows: a rotor core temperature: 160° C. and a curing time: 120 seconds.

For the obtained fixing resin composition and rotor, the measurements and evaluations as shown below were carried out. The results are shown in Tables 1 and 2. The rotors in Examples were excellent in strength.

(Evaluation Items)

Spiral Flow: The fixing resin composition was injected into a mold used for spiral flow measurement in accordance to ANSI/ASTM D 3123-72, using a low-pressure transfer molding machine (KTS-15, manufactured by Kohtaki Precision Machine Co., Ltd.) for insert molding under the conditions of 175° C., an injection pressure of 6.9 MPa, and a holding time of 120 seconds, and the flow length was measured. The spiral flow is a parameter of flowability, and a larger value thereof indicates better flowability. The unit of the spiral flow in Tables 1 and 2 is cm.

Gel Time: The fixing resin composition was loaded on a heat plate controlled to 175° C., and then kneaded with a spatula at a stroke of about once/sec. After the fixing resin composition was molten by heat, the time taken for curing is measured and defined as a gel time. The unit of the gel time in Tables 1 and 2 is sec.

Koka-type Viscosity: About 2.5 g of the fixing resin composition was shaped into a tablet (diameter of 11 mm, height of about 15 mm), and then the Koka-type viscosity was measured using a Koka-type viscosity measurement device (CFT-500D manufactured by Shimadzu Corporation), with nozzles (dice) at a diameter of 0.5 mm and a length of 1.0 mm, under the conditions of a measurement temperature of 175° C. and a load of 10 kg. The unit of the Koka-type viscosity in Tables 1 and 2 is Pa·s.

Curelast Torque Ratio: When the cure torque of the fixing resin composition was measured over time at a measurement temperature of 175° C. using a curelastometer (JSR curelastometer IVPS type, manufactured by Orientec Co., Ltd.), the cure torque value at 60 seconds after measurement initiation was defined as $T_{60}$ and the maximum cure torque value up to 300 seconds after measurement initiation was defined as $T_{max}$, the ratio of the cure torque value at 60 seconds after measurement initiation to the maximum cure torque value up to 300 seconds after measurement initiation, $T_{60}/T_{max}$ (%), was determined as a curelast torque ratio. The torque in the curelastometer is a parameter for thermal rigidity, and thus, a larger curelast torque ratio indicates better curability.

Slit Flow Length: The fixing resin composition was injection-molded in a mold radially provided with grooves (slits) each having a specific thickness with open tips under the conditions of a mold temperature of 175° C., a molding pressure of 6.9 MPa, an injection time of 20 seconds, and a curing time of 90 seconds, and the length of the resin flowing out to the slit with a width of 3 mm and a thickness of 80 μm was measured with a vernier caliper. The unit is mm.

Rotor Moldability: A mold (a width of 30 mm, a thickness of 4 mm, and a depth of 75 mm of the hole portions) chosen as an electromagnetic steel plate, in which a metal piece (a width of 28 mm, a thickness of 3.8 mm, and a length of 74 mm) chosen as a magnet had been inserted, was set in a molding machine. Then, when the mold temperature reached 170° C., the fixing resin composition was injection-molded, and the mold was taken out of the molding machine after a curing time of 120 seconds. The appearance of the molded article was visually observed to check if there were any abnormalities such as a void. The state where there was no abnormality such as a void is denoted as A and the state where there was abnormality such as a void is denoted as B.

Glass Transition Temperature: The fixing resin composition was injection-molded using a low-pressure transfer molding machine (KTS-30, manufactured by Kohtaki Precision Machine Co., Ltd.) for insert molding under the conditions of a mold temperature of 175° C., an injection pressure of 9.8 MPa, and a curing time of 2 minutes to obtain a test piece at 4 mm×4 mm×15 mm. After curing the obtained test piece at 175° C. for 4 hours, the linear expansion coefficient (α1) in the region at equal to or lower than the glass transition temperature and the linear expansion coefficient (α2) in the region corresponding to the rubber state are determined, from the chart, as measured at a temperature rising rate of 5° C./min in the temperature region in a measurement temperature range from 0° C. to 320° C., using a thermal machine analysis device (TMA100, manufactured by Seiko Eletronics Industrial Co., Ltd). Here, the intersection of the extended lines of the α1 and α2 is defined as a glass transition temperature. In Tables 1 and 2, the unit of the glass transition temperature is ° C. and the unit of the linear expansion coefficients (α1, α2) is ppm/° C.

Flame resistance: The fixing resin composition was injection-molded under the conditions of a mold temperature of 175° C., an injection pressure of 9.8 MPa, an injection time of 15 seconds, and a curing time of 120 seconds, using a low-pressure transfer molding machine (KTS-30, manufactured by Kohtaki Precision Machine Co., Ltd.) for insert molding, to prepare a flame resistant test piece having 127 mm×12.7 mm×thickness of 3.2 mm. The test piece was subjected to a flame resistance test in accordance with a standard specified in the UL-94 vertical method to determine the flame resistance. The flame ranks and the like are shown. Since the flame retardancy was not an essential condition in the present invention, the flame retardancy may be appropriately adjusted.

Break energy a and b: A curable product of a fixing resin composition a rotor, molded into a dumbbell form in accordance with JIS K7162 (hereinafter referred to as a test piece), was subjected to a tensile test under the conditions of a load speed of 1.0 mm/min at 25° C. or 150° C. In this tensile test, Tensilon UCT-30T Type manufactured by Orientec Co., Ltd. was used as a Tensilon and Type KFG-2-120-D16-11L1M2R manufactured by Kyowa Electronic Instruments Co., Ltd. was used as a strain gauge.

The relationship between the vertical stress and the vertical strain in the in the tensile test was graphed into a curve (stress-strain curve). Next, using the strain as the variables, the integral values of the strain from the start to the break in the tensile test was calculated. Further, the unit was ×10$^{-4}$ J/mm$^3$.

Oil Resistance: The fixing resin composition was injection-molded under the conditions of a mold temperature of 175° C., an injection pressure of 9.8 MPa, and a curing time of 120 seconds, using a molding machine (KTS-30, manufactured by Kohtaki Precision Machine Co., Ltd.), to obtain a molded article (curable product) having a length of 80 mm, a width of 10 mm, and a thickness of 4 mm. The obtained molded article which had been subjected to a heating treatment at 175° C. for 4 hours as a post-curing was used as a test piece, and the flexural strength and the flexural elastic modulus were measured under an atmosphere at 25° C. in accordance with JIS K 6911. Next, this test piece was placed in a pressure-resistant container and the pressure-resistant container was immersed at a temperature of 150° C. and 1000 hours in the state where ATF oil (Nissan Matic Fluid D) was filled in the container, and then the flexural strength and the flexural elastic modulus were measured by such a method as above. A case where the change rate with respect to the initial values before immersion in the ATF oil is equal to or less than 10% is defined as A and a case where the change rate with respect to the initial values before immersion in the ATF oil is more than 10% is defined as B.

ATF Immersion Test (1000 hours): The fixing resin composition was injection-molded under the conditions of a mold temperature of 175° C., an injection pressure of 9.8 MPa, and a curing time of 120 seconds, using a molding machine (KTS-30, manufactured by Kohtaki Precision Machine Co., Ltd.), to obtain a molded article (curable product) having a length of 80 mm, a width of 10 mm, and a thickness of 4 mm. The obtained molded article which had been subjected to a heating treatment at 175° C. for 4 hours as a post-curing was used as a test piece, and the weight X1 and the volume Y1 before immersion in ATF were measured. Next, the test piece was placed in a pressure-resistant container and immersed at 150° C. for 1000 hours in the state where ATF was filled. Further, the test piece was taken out of the pressure-resistant container the ATF adhered to the surface was wiped. Then, the weight X2 and the volume Y2 after immersion in ATF were measured, and the change rate of the weight and the change rate of the volume between before and after immersion in ATF were each calculated by the following equations.

Change rate [%] of the weight between before and after immersion in ATF=$(X2-X1)/X1 \times 100$ Change rate [%] of the volume between before and after immersion in ATF=$(Y2-Y1)/Y1 \times 100$ In addition, as the ATF, Matic Fluid D (manufactured by Nissan Motor Co., Ltd.), Automatic Fluid Type T-IV (manufactured by Toyota Motor Corporation), and ATF DW-1 (manufactured by Honda R&D Co., Ltd.) were used, respectively.

ATF Immersion Test (2000 hours): In the same manner as for the ATF immersion test (1000 hours) except that the ATF immersion time was changed to 2000 hours, the change rate of the weight and the change rate of the volume between before and after immersion in ATF were calculated, respectively.

Elimination of Inorganic Filler: After the ATF immersion test, the ATF oil was filtered off and the presence or absence of the inorganic filler on filter paper was checked by microscopy.

TABLE 1

|  |  | ICI viscosity at 150° C. | Example 1 | Example 2 | Example 3 | Example 4 | Example 5 | Example 6 |
|---|---|---|---|---|---|---|---|---|
| Epoxy resin 1 | YK4000K | 0.11 | 7.69 |  | 4.57 |  |  |  |
| Epoxy resin 2 | YSLV-80YX | 0.03 |  | 7.82 |  |  |  |  |
| Epoxy resin 3 | N-665 | 3.06 |  |  | 4.58 |  |  |  |
| Epoxy resin 4 | NC-2000 | 1.2 |  |  |  | 8.24 |  |  |
| Epoxy resin 5 | NC3000 | 0.85 |  |  |  |  | 8.12 |  |
| Epoxy resin 6 | E-1032H-60 | 1.3 |  |  |  |  |  | 8.16 |
| Phenolic resin 1 | PR-HF-3 | 1.08 | 4.16 | 3.83 | 4.5 |  |  |  |
| Phenolic resin 2 | MEH-7800-4S | 0.73 |  |  |  | 5.41 |  |  |
| Phenolic resin 3 | MEH-7851SS | 0.68 |  |  |  |  | 5.68 |  |
| Phenolic resin 4 | HE910-20 | 1.5 |  |  |  |  |  | 4.59 |
| Spherical silica 1 | FB-950 |  | 60 | 60 | 57 | 57 | 68 |  |
| Spherical silica 2 | FB-35 |  | 20 | 20 | 20 | 20 |  |  |
| Spherical silica 3 | SO-25R |  |  |  |  |  | 10 |  |
| Alumina | DAW-45 |  |  |  |  |  |  | 84 |
| Curing accelerator 1 |  |  | 0.2 |  |  |  |  | 0.3 |
| Curing accelerator 2 |  |  |  | 0.4 |  |  |  |  |
| Curing accelerator 3 |  |  |  |  | 0.4 |  |  |  |
| Curing accelerator 4 |  |  |  |  |  | 0.4 |  |  |
| Curing accelerator 5 |  |  |  |  |  |  | 0.25 |  |
| Coupling agent 1 | CF-4083 |  | 0.4 | 0.4 | 0.4 | 0.4 | 0.4 | 0.4 |
| Inorganic flame retardant | CL-303 |  | 5 | 5 | 6 | 6 | 5 |  |
| Ion scavenger | DHT-4H |  | 0.1 | 0.1 | 0.1 | 0.1 | 0.1 | 0.1 |
| Colorant | MA600 |  | 0.25 | 0.25 | 0.25 | 0.25 | 0.25 | 0.25 |
| Releasing agent | Hoechst wax E |  | 0.2 | 0.2 | 0.2 | 0.2 | 0.2 | 0.2 |
| Low-stress agent 1 | KMP-594 |  | 1 | 1 | 1 | 1 | 1 | 1 |
| Low-stress agent 2 | TZ-8120 |  | 1 | 1 | 1 | 1 | 1 | 1 |
| Spiral flow (cm) |  |  | 170 | 220 | 180 | 150 | 150 | 140 |
| Gel time (sec) |  |  | 25 | 45 | 40 | 40 | 35 | 35 |
| Koka-type viscosity (Pa · s) |  |  | 8 | 6 | 10 | 12 | 12 | 12 |
| Curelast torque ratio (%) |  |  | 60 | 50 | 55 | 55 | 55 | 60 |
| Rotor moldability |  |  | A | A | A | A | A | A |
| Spacing of separation portion between hole portion and the magnet (μm) |  |  | 100 | 100 | 100 | 100 | 100 | 100 |
| 80-μm Slit flow length (mm) |  |  | 150 | 180 | 110 | 90 | 90 | 85 |
| Glass transition temperature (° C.) |  |  | 140 | 135 | 150 | 145 | 140 | 190 |
| Heat resistance (3.2 mm in thickness) |  |  | V-0 | V-0 | V-0 | V-0 | V-0 | Burned |
| Oil resistance |  |  | A | A | A | A | A | A |

TABLE 2

|  |  | ICI viscosity at 150° C. | Comparative Example 1 | Comparative Example 2 |
|---|---|---|---|---|
| Epoxy resin 1 | YK4000K | 0.11 |  |  |
| Epoxy resin 2 | YSLV-80YX | 0.03 |  |  |
| Epoxy resin 3 | N-665 | 3.06 |  |  |
| Epoxy resin 4 | NC-2000 | 1.2 |  |  |
| Epoxy resin 5 | NC3000 | 0.85 |  |  |
| Epoxy resin 6 | E-1032H-60 | 1.3 |  |  |
| Epoxy resin 7 | N-670 | 4.28 | 15.5 | 15.5 |
| Phenolic resin 1 | PR-HF-3 | 1.08 |  |  |
| Phenolic resin 2 | MEH-7800-4S | 0.73 |  |  |
| Phenolic resin 3 | MEH-7851SS | 0.68 |  |  |
| Phenolic resin 4 | HE910-20 | 1.5 |  |  |
| Phenolic resin 5 | PR-51714 | 1.64 | 7.75 | 7.75 |
| Spherical silica 1 | FB-950 |  | 30 | 30 |
| Spherical silica 2 | FB-35 |  | 30 | 30 |
| Spherical silica 3 | SO-25R |  | 30 | 30 |
| Alumina | DAW-45 |  |  |  |
| Curing accelerator 1 |  |  | 0.3 |  |
| Curing accelerator 2 |  |  |  | 0.4 |
| Curing accelerator 3 |  |  |  |  |
| Curing accelerator 4 |  |  |  |  |
| Curing accelerator 5 |  |  |  |  |
| Coupling agent 1 | CF-4083 |  | 0.2 |  |
| Coupling agent 2 | KBM-403 |  |  | 0.2 |
| Inorganic flame retardant | CL-303 |  | 13.65 | 13.55 |
| Ion scavenger | DHT-4H |  | 0.1 | 0.1 |
| Colorant | MA600 |  | 0.25 | 0.25 |

TABLE 2-continued

|  | ICI viscosity at 150° C. | Comparative Example 1 | Comparative Example 2 |
|---|---|---|---|
| Releasing agent | Hoechst wax E | 0.2 | 0.2 |
| Low-stress agent 1 | KMP-594 | 1 | 1 |
| Low-stress agent 2 | TZ-8120 | 1 | 1 |
| Spiral flow (cm) | | 72 | 78 |
| Gel time(sec) | | 26 | 44 |
| Koka-type viscosity (Pa · s) | | 14 | 11 |
| Curelast torque ratio (%) | | 67 | 60 |
| Rotor moldability | | B | B |
| Spacing of separation portion between hole portion and the magnet (μm) | | 100 | 100 |
| 80-μm Slit flow length (mm) | | 43 | 51 |
| Glass transition temperature (° C.) | | 161 | 163 |
| Heat resistance (3.2 mm in thickness) | | V-0 | V-0 |
| Oil resistance | | A | A |

TABLE 3

|  |  | Example 1 | Example 2 | Example 3 | Example 4 | Example 5 | Example 6 |
|---|---|---|---|---|---|---|---|
| Break energy a (25° C.) [$\times 10^{-4}$ J/mm$^3$] | | 2.2 | 2.3 | 2.0 | 2.4 | 2.5 | 1.9 |
| Break energy b (150° C.) [$\times 10^{-4}$ J/mm$^3$] | | 1.7 | 1.7 | 1.6 | 1.8 | 1.8 | 1.6 |
| Break strength a (25° C.) [MPa] | | 75 | 75 | 70 | 70 | 69 | 77 |
| Break strength b (150° C.) [MPa] | | 25 | 27 | 30 | 28 | 24 | 32 |
| ATF immersion test automatic fluid type T-IV | Change rate (%) of weight after 1000 hours (%) | 0.19 | 0.17 | 0.21 | 0.26 | 0.31 | 0.17 |
|  | Change rate (%) of weight after 2000 hours (%) | 0.22 | 0.21 | 0.23 | 0.31 | 0.33 | 0.23 |
|  | Change rate (%) in volume after 1000 hours (%) | 0.62 | 0.55 | 0.62 | 0.71 | 0.81 | 0.51 |
|  | Release of inorganic filler | None | None | None | None | None | None |
| ATF immersion test ATF DW-1 | Change rate (%) of weight after 1000 hours (%) | 0.16 | 0.16 | 0.19 | 0.23 | 0.30 | 0.17 |
|  | Change rate (%) of weight after 2000 hours (%) | 0.21 | 0.22 | 0.23 | 0.27 | 0.33 | 0.24 |
|  | Change rate (%) in volume after 1000 hours (%) | 0.61 | 0.56 | 0.65 | 0.72 | 0.77 | 0.50 |
|  | Release of inorganic filler | None | None | None | None | None | None |
| ATF immersion test matching fluid D | Change rate (%) of weight after 1000 hours (%) | 0.19 | 0.17 | 0.21 | 0.27 | 0.30 | 0.20 |
|  | Change rate (%) of weight after 2000 hours (%) | 0.23 | 0.22 | 0.24 | 0.33 | 0.35 | 0.23 |
|  | Change rate (%) in volume after 1000 hours (%) | 0.65 | 0.62 | 0.66 | 0.77 | 0.86 | 0.60 |
|  | Release of inorganic filler | None | None | None | None | None | None |

From Examples 1 to 6, it could be seen that a fixing resin composition, which has excellent filling properties, mechanical properties, and oil resistance and can exhibit good properties in an ATF immersion test, can be obtained.

In addition, in Comparative Examples 1 and 2, in which the ICI viscosity of the epoxy resin exceeds 3, the 80-1 μm slit flow length was less than 75 in any case. Thus, in Comparative Examples 1 and 2, a fixing resin composition having sufficient filling properties could not be obtained.

Furthermore, it is clear that the embodiments and a plurality of modifications thereof as described above may be combined within a range the amounts not conflicting with each other. Further, the structures of the respective portions in the embodiments and a plurality of modifications thereof as described above are specifically described above, and various modifications may be added within a range satisfying the present invention.

REFERENCE SIGNS LIST

100 ROTOR
110 ROTOR CORE
112 STEEL PLATE
114 END PLATE
116 GROOVES
118a, 118b END PLATE
120 MAGNET
121 SIDE WALL
123 SIDE WALL
130 FIXING MEMBER
140 FILLING PORTION
150 HOLE PORTION
151 SIDE WALL
152 HOLE PORTION
153 SIDE WALL
154a, 154b HOLE PORTION
156 HOLE PORTION
160 CAULKING PORTION

170 SHAFT
200 UPPER MOLD
210 POT
220 FLOW PASSAGE

The invention claimed is:

1. A solid fixing resin composition, used to form a fixing member constituting a rotor which includes:
   a rotor core which has a laminate formed by lamination of a plurality of plate members and is fixed and installed on a rotating shaft, wherein a plurality of hole portions arranged along the peripheral portion of the rotating shaft are provided on the laminate;
   a magnet inserted in the hole portions; and
   a fixing member formed by curing the fixing resin composition filled in a separation portion between the hole portion and the magnet,
   the fixing resin composition comprising:
   a thermosetting resin (A) containing an epoxy resin;
   a curing agent (B); and
   an inorganic filler (C),
   an inorganic flame retardant,
   wherein the inorganic filler (C) contains two or more kinds of spherical silica having different average particle diameters $D_{50}$,
   wherein an amount of the inorganic flame retardant is equal to or more than 1% by mass and equal to or less than 20% by mass, based on 100% by mass of a total amount of the fixing resin composition,
   wherein a sum of the inorganic filler (C) and the inorganic flame retardant is equal to or more than 50% by mass and equal to or less than 93% by mass, based on 100% by mass of the total amount of the fixing resin composition,
   wherein the ICI viscosity at 150° C. of the epoxy resin is equal to or less than 3 poises, and
   wherein the spiral flow of the fixing resin composition is equal to or more than 140 cm.

2. The fixing resin composition according to claim 1, wherein when the fixing resin composition is injected into a flow passage having a cross-sectional shape with a width of 3 mm and a thickness of 80 μm under the conditions of a mold temperature of 175° C., a molding pressure of 6.9 MPa, and an injection time of 20 seconds, the slit flow length is equal to or more than 75 mm.

3. The fixing resin composition according to claim 2, wherein the epoxy resin includes at least one selected from the group consisting of a biphenyl type epoxy resin, a phenolaralkyl type epoxy resin having a phenylene skeleton, a phenolaralkyl type epoxy resin having a biphenylene skeleton, a phenol novolac type epoxy resin, an orthocresol novolac type epoxy resin, a bisphenol type epoxy resin, a bisnaphthol type epoxy resin, a dicyclopentadiene type epoxy resin, a dihydroanthracenediol type epoxy resin, and a triphenylmethane type epoxy resin.

4. The fixing resin composition according to claim 1, wherein the epoxy resin includes at least one selected from the group consisting of a biphenyl type epoxy resin, a phenolaralkyl type epoxy resin having a phenylene skeleton, a phenolaralkyl type epoxy resin having a biphenylene skeleton, a phenol novolac type epoxy resin, an orthocresol novolac type epoxy resin, a bisphenol type epoxy resin, a bisnaphthol type epoxy resin, a dicyclopentadiene type epoxy resin, a dihydroanthracenediol type epoxy resin, and a triphenylmethane type epoxy resin.

5. The fixing resin composition according to claim 1, wherein the ICI viscosity at 150° C. of the curing agent (B) is equal to or less than 2 poises.

6. The fixing resin composition according claim 1, wherein the curing agent (B) includes at least one selected from the group consisting of a novolac type phenolic resin, a phenolaralkyl resin having a phenylene skeleton, a phenolaralkyl resin having a biphenylene skeleton, a naphthol type phenolic resin, and a phenolic resin mainly formed of a reaction product of hydroxybenzaldehyde, formaldehyde, and phenol.

7. The fixing resin composition according to claim 1, wherein the epoxy resin is a crystalline epoxy resin.

8. The fixing resin composition according to claim 1, wherein the Koka-type viscosity of the fixing resin composition, as measured at a measurement temperature of 175° C. and a load of 10 kg using a Koka-type viscosity measurement device, is equal to or more than 3 Pas and equal to or less than 50 Pas.

9. The fixing resin composition according to claim 1, wherein the gel time of the fixing resin composition at 175° C. is equal to or more than 10 seconds and equal to or less than 50 seconds.

10. The fixing resin composition according to claim 1, wherein when the cure torque of the fixing resin composition is measured over a period of time at a measurement temperature of 175° C. using a curelastometer, the cure torque value at 60 seconds after measurement initiation is defined as $T_{60}$ and the maximum cure torque value up to 300 seconds after measurement initiation is defined as $T_{max}$, the ratio of the cure torque value at 60 seconds after measurement initiation to the maximum cure torque value up to 300 seconds after measurement initiation, $T_{60}/T_{max}$ (%), is equal to or more than 40%.

11. The fixing resin composition according to claim 1, which is in the powder shape, the granule shape, or the tablet shape.

12. The fixing resin composition according to claim 1, which is used to form the fixing member constituting the rotor, in which the spacing of the separation portion between the hole portion and the magnet in the diameter direction of the rotor, as seen from the upper surface, is equal to or more than 20 μm and equal to or less than 500 μm.

13. The fixing resin composition according to claim 1, wherein an average particle diameter $D_{50}$ of the inorganic filler (C) is equal to or more than 0.01 μm and equal to or less than 75 μm.

14. The fixing resin composition according to claim 1, comprises an ion scavenger.

15. The fixing resin composition according to claim 1, wherein an upper limit of concentration of ionic impurities is equal to or less than 500 ppm, and a lower limit of concentration of the iconic impurities is equal to or more than 0 ppb.

16. A rotor comprising:
   a rotor core which has a laminate formed by lamination of a plurality of plate members and is fixed and installed on a rotating shaft, wherein a plurality of hole portions arranged along the peripheral portion of the rotating shaft are provided on the laminate;
   a magnet inserted in the hole portions; and
   a fixing member formed by curing the fixing resin composition filled in a separation portion between the hole portion and the magnet,
   wherein the fixing resin composition, used to form the fixing member constituting the core, is the fixing resin composition according to claim 1.

17. The rotor according to claim 16, wherein the spacing of the separation portion between the hole portion and the magnet in the diameter direction of the rotor, as seen from the upper surface, is equal to or more than 20 μm and equal to or less than 500 μm.

18. An automobile comprising the rotor according to claim 16.

19. A method of manufacturing a rotor, which is carried out using the fixing composition according to claim 1, comprising:
- a step of preparing a rotor core which has a laminate formed by lamination of a plurality of plate members and has a plurality of hole portions arranged along the peripheral portion of a through hole through which a rotating shaft is penetrated, provided on the laminate;
- a step of inserting a magnet into the hole portion;
- a step of filling the fixing resin composition in a separation portion between the hole portion and the magnet; and
- a step of inserting the rotating shaft into the thorough hole of the rotor core, and fixing and installing the rotating shaft in the rotor core.

* * * * *